(12) United States Patent
Xu et al.

(10) Patent No.: US 11,019,646 B2
(45) Date of Patent: May 25, 2021

(54) METHOD, TERMINAL, AND NETWORK DEVICE FOR COMMUNICATION USING GRANT-FREE MODE AND GRANT MODE

(71) Applicant: Huawei Technologies Co., Ltd., Guangdong (CN)

(72) Inventors: Xiuqiang Xu, Shanghai (CN); Yan Chen, Shanghai (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 16/262,611

(22) Filed: Jan. 30, 2019

(65) Prior Publication Data

US 2019/0166609 A1 May 30, 2019

Related U.S. Application Data

(63) Continuation of application No. PCT/CN2017/090375, filed on Jun. 27, 2017.

(30) Foreign Application Priority Data

Aug. 10, 2016 (CN) .......................... 201610652562.3

(51) Int. Cl.
*H04W 72/12* (2009.01)
*H04W 72/14* (2009.01)
*H04W 72/04* (2009.01)

(52) U.S. Cl.
CPC ....... *H04W 72/1268* (2013.01); *H04W 72/04* (2013.01); *H04W 72/14* (2013.01)

(58) Field of Classification Search
CPC . H04W 72/1268; H04W 72/04; H04W 72/14; H04W 72/042; H04W 72/085; H04L 1/188; H04L 1/1867
See application file for complete search history.

(56) References Cited

U.S. PATENT DOCUMENTS 7,382,757 B2 * 6/2008 LoGalbo ............... H04W 88/08
370/338
8,855,073 B2 * 10/2014 Han .................... H04W 74/002
370/329
(Continued)

FOREIGN PATENT DOCUMENTS

CN 103517456 A 1/2014
CN 104838713 A 8/2015
(Continued)

OTHER PUBLICATIONS

Intel Corporation, "Overview of new radio access technology requirements and designs", 3GPP TSG RAN WG1 Meeting #84bis, Busan, Korea Apr. 11-15, 2016, 4 pages, R1-162379.
"3rd Generation Partnership Project; Technical Specification Group Services and System Aspects; Feasibility Study on New Services and Markets Technology Enablers—Critical Communications; Stage 1 (Release 14)", 3GPP TR 22.862 V0.3.0 (Feb. 2016), 22 pages.
(Continued)

*Primary Examiner* — Hoang-Chuong Q Vu
(74) *Attorney, Agent, or Firm* — Slater Matsil, LLP

(57) ABSTRACT

A data transmission method, a terminal, and a network device are provided, to improve reliability of data transmission performed by a terminal in a grant-free mode. In embodiments of the present invention, a terminal sends, in a grant-free mode, first data to a network device by using a grant-free resource, and if the terminal needs to switch from the grant-free mode to a grant mode, the terminal sends, in the grant mode, second data to the network device by using a grant resource. When the terminal initially transmits the first data in the grant-free mode, if the terminal needs to switch from the grant-free mode to the grant mode, the terminal may fall back to the grant mode and transmit data in the grant mode. In this way, reliability of data transmission is improved and a success rate of data transmission is improved to a relatively great extent.

17 Claims, 9 Drawing Sheets

---

A terminal sends, in a grant-free mode, first data to a network device by using a grant-free resource ~ 201

If the terminal needs to switch from the grant-free mode to a grant mode, the terminal sends, in the grant mode, second data to the network device by using a grant resource ~ 202

(56) References Cited

U.S. PATENT DOCUMENTS

| | | | | |
|---|---|---|---|---|
| 10,187,183 | B2* | 1/2019 | Islam | H04L 5/0096 |
| 10,393,850 | B2* | 8/2019 | Amizur | G01S 5/08 |
| 2005/0141448 | A1* | 6/2005 | Bolinth | H04W 74/0808 370/329 |
| 2010/0074190 | A1* | 3/2010 | Cordeiro | H04W 48/16 370/329 |
| 2010/0309872 | A1* | 12/2010 | Amini | H04W 74/002 370/329 |
| 2011/0058529 | A1* | 3/2011 | Uemura | H04W 36/0077 370/331 |
| 2013/0021982 | A1* | 1/2013 | Kim | H04L 1/1887 370/328 |
| 2014/0254544 | A1 | 9/2014 | Kar Kin Au et al. | |
| 2015/0009962 | A1 | 1/2015 | Clegg | |
| 2016/0323911 | A1 | 11/2016 | Au et al. | |
| 2017/0048861 | A1* | 2/2017 | Choi | H04L 5/0053 |
| 2017/0127435 | A1* | 5/2017 | Rong | H04L 27/2646 |
| 2017/0142599 | A1* | 5/2017 | Babaei | H04W 24/10 |
| 2017/0288817 | A1* | 10/2017 | Cao | H04L 1/1812 |
| 2017/0318584 | A1* | 11/2017 | Zeng | H04W 72/14 |
| 2018/0035459 | A1* | 2/2018 | Islam | H04W 74/04 |
| 2018/0124598 | A1* | 5/2018 | Zeng | H04W 12/08 |
| 2018/0242310 | A1 | 8/2018 | Au et al. | |
| 2019/0166553 | A1* | 5/2019 | Ryoo | H04W 76/20 |
| 2019/0306879 | A1* | 10/2019 | Seo | H04W 76/11 |

FOREIGN PATENT DOCUMENTS

| | | |
|---|---|---|
| CN | 105284172 A | 1/2016 |
| CN | 105323858 A | 2/2016 |
| WO | 2015199902 A1 | 12/2015 |

OTHER PUBLICATIONS

Nokia et al., "Procedure design for contention based access", 3GPP TSG-RAN WG1 #86, Gothenburg, Sweden, Aug. 22-26, 2016, 4 pages, R1-167255.

Erdal Arikan et al., "Channel Polarization: A Method for Constructing Capacity-Achieving Codes for Symmetric Binary-Input Memoryless Channels", IEEE Transactions on Information Theory, vol. 55, No. 7, Jul. 2009, 23 pages.

Ricardo Blasco-Serrano et al., "Polar Codes for Cooperative Relaying", IEEE Transactions on Communications, vol. 60, No. 11, Nov. 2012, 11 pages.

ZTE,"Grant-based and grant-free multiple access for mMTC," 3GPP TSG RAN WG1 Meeting #85, R1-164268, May 23-27, 2016, 4 pages, Nanjing,China.

Sharp, "Parallel Random Access Procedures," 3GPP TSG-RAN WG2#75, R2-114098, Aug. 22-26, 2011, 4 pages, Athens, Greece.

R1-162379 Intel Corporation,"Overview of new radio access technology requirements and designs", 3GPP TSG RAN WG1 Meeting #84bis, Busan, Korea Apr. 11-15, 2016, 4 pages.

3GPP TR 22.862 V0.3.0 (Feb. 2016), 3rd Generation Partnership Project;Technical Specification Group Services and System Aspects;Feasibility Study on New Services and Markets Technology Enablers—Critical Communications; Stage 1 (Release 14), 22 pages.

R1-167255 Nokia et al.,"Procedure design for contention based access",3GPP TSG-RAN WG1 #86,Gothenburg, Sweden, Aug. 22-26, 2016, 4 pages, vol. 55, No. 7.

Arikan, E.,"Channel Polarization: A Method for Constructing Capacity-Achieving Codes for Symmetric Binary-Input Memoryless Channels", Jul. 20, 2009, 23 pages.

Blasco-Serrano, R. et al.,"Polar Codes for Cooperative Relaying", IEEE Transactions on Communications, Nov. 2012, 11 pages, vol. 60, No. 11.

* cited by examiner

METHOD, TERMINAL, AND NETWORK DEVICE FOR COMMUNICATION USING GRANT-FREE MODE AND GRANT MODE

CROSS-REFERENCE TO RELATED APPLICATIONS

This application is a continuation of International Application No. PCT/CN2017/090375 filed on Jun. 27, 2017, which claims priority to Chinese Patent Application No. 201610652562.3 filed on Aug. 10, 2016. The disclosures of the aforementioned applications are hereby incorporated by reference in their entireties.

TECHNICAL FIELD

Embodiments of the present disclosure relate to the communications field, and in particular, to a data transmission method, a terminal, and a network device.

BACKGROUND

In a wireless cellular network, such as a Long Term Evolution (LTE) system, before sending uplink data to a network device, a terminal first needs to send a random access request to the network device, so that after receiving a random access response returned by the network device, the terminal sets up a radio resource control (RRC) connection to the network device. After setting up the RRC connection, the terminal enters a radio resource control connected mode, and the terminal sends a scheduling request (SR) to the network device. If the network device allows the terminal to send the uplink data, the network device sends a grant instruction to the terminal and allocates a grant resource to the terminal, so that only after receiving the grant instruction, the terminal can send the uplink data to the network device according to a requirement of the instruction by using the grant resource. This data transmission process is referred to as granted transmission.

The granted transmission has a relatively high latency. The latency is specifically a latency from a time when the terminal determines that there is to-be-sent uplink data to a time when the terminal sends the uplink data through an air interface. In addition, when a relatively large quantity of terminals need to send uplink data in a period of time, an excessively large quantity of uplink and downlink control channel resources are consumed for sending scheduling requests and grant instructions. Consequently, control overheads occupy a relatively high proportion in total network overheads (for example, a power resource and an air interface resource). In particular, when all services of the terminal are small data packet services, this disadvantage of the granted transmission is obvious.

Grant-free transmission can avoid the problem in the foregoing granted transmission. A basic idea of the grant-free transmission is that data "goes soon after coming". To be specific, the network device preconfigures a batch of resources as grant-free resources. When the terminal determines that there is to-be-sent uplink data, the terminal does not need to send a random access request and a scheduling request or wait to receive a grant instruction from the network device, but instead, the terminal directly sends the uplink data obtained after processing to the network device by using a grant-free resource. In this process, before the terminal performs the grant-free transmission, the network device usually needs to specify an available grant-free resource for the terminal in advance, for example, an uplink pilot resource and a time-frequency resource, and the network device may need to use a method such as blind detection, to receive data sent by the terminal.

It can be learned that the foregoing grant-free transmission has a low latency, and because no random access request, scheduling request, or grant instruction may be transmitted in the uplink data transmission process, total network overheads are reduced. In addition, massive machine-type communication (mMTC) has been defined as one of three major application scenarios of 5G. Typical features of this scenario are as follows: There are a huge quantity of terminals; services are mainly small data packet services; and there is a specific requirement for a low latency. In this scenario, grant-free transmission is better than granted transmission.

In a grant-free transmission mode, the terminal may improve transmission reliability by using technologies such as (time domain, frequency domain, and space domain) diversity transmission and a hybrid automatic repeat request (HARQ) technology. However, uplink data may still fail to be transmitted in the grant-free mode due to a factor such as a pilot collision or a poor channel condition. Therefore, for a terminal in a grant-free mode, how to further improve reliability of data transmission becomes an urgent problem.

SUMMARY

Embodiments of the present disclosure provide a data transmission method, a terminal, and a network device, to improve reliability of data transmission performed by a terminal in a grant-free mode.

According to a first aspect, an embodiment of the present disclosure provides a data transmission method, including: sending, by a terminal in a grant-free mode, first data to a network device by using a grant-free resource; and if the terminal needs to switch from the grant-free mode to a grant mode, sending, by the terminal in the grant mode, second data to the network device by using a grant resource.

When the terminal transmits the first data in the grant-free mode, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Optionally, the sending, by a terminal in a grant-free mode, first data to a network device by using a grant-free resource includes: initially transmitting, by the terminal, the first data to the network device for the first time in the grant-free mode by using the grant-free resource; and initially transmitting, by the terminal, the first data to the network device again when no acknowledge frame returned by the network device for the first data initially transmitted for the first time is received within preset first duration. That the terminal needs to switch from the grant-free mode to the grant mode includes: determining, by the terminal when determining that a quantity of times the first data is initially transmitted reaches a preset initial transmission times threshold, that the terminal needs to switch from the grant-free mode to the grant mode. In this way, when the terminal fails, for a plurality of times, to initially transmit data to the network device, the terminal can fall back to the grant mode in a timely manner. This improves reliability of initial data transmission from the terminal to the network device.

Optionally, the sending, by a terminal in a grant-free mode, first data to a network device by using a grant-free resource includes: initially transmitting, by the terminal, the first data to the network device for the first time in the grant-free mode by using the grant-free resource. That the terminal needs to switch from the grant-free mode to the grant mode includes: determining, by the terminal when duration starting from a time when the first data is initially transmitted for the first time reaches a preset duration threshold and no acknowledge frame returned by the network device for the first data is received, that the terminal needs to switch from the grant-free mode to the grant mode. In this way, when the duration starting after the terminal initially transmits the first data to the network device reaches the duration threshold and no acknowledge frame returned by the network device is received, the terminal can fall back to the grant mode in a timely manner. This improves reliability of initial data transmission from the terminal to the network device.

Optionally the sending, by a terminal in a grant-free mode, first data to a network device by using a grant-free resource includes: initially transmitting, by the terminal, the first data to the network device for the first time in the grant-free mode by using the grant-free resource; retransmitting, by the terminal, the first data to the network device when no acknowledge frame returned by the network device for the first data is received within preset second duration, and counting, by using a counter, a quantity of times the first data is retransmitted; and initially transmitting, by the terminal, the first data again if the terminal determines that a value of the counter increases to a preset retransmission times threshold and determines that no acknowledge frame returned by the network device for the first data is received within preset third duration. That the terminal needs to switch from the grant-free mode to the grant mode includes: determining, by the terminal when a quantity of times the first data is initially transmitted reaches a preset initial transmission times threshold and no acknowledge frame returned by the network device for the first data is received, that the terminal needs to switch from the grant-free mode to the grant mode. In this way, when the terminal fails, for a plurality of times, to initially transmit data to the network device, the terminal can fall back to the grant mode in a timely manner. This improves reliability of initial data transmission from the terminal to the network device.

Optionally, the sending, by a terminal in a grant-free mode, first data to a network device by using a grant-free resource includes: initially transmitting, by the terminal, the first data to the network device for the first time in the grant-free mode by using the grant-free resource; retransmitting, by the terminal, the first data to the network device when no acknowledge frame returned by the network device for the first data is received within preset second duration, and counting, by using a counter, a quantity of times the first data is retransmitted; and initially transmitting, by the terminal, the first data again if the terminal determines that a value of the counter increases to a preset retransmission times threshold and determines that no acknowledge frame returned by the network device for the first data is received within preset third duration. That the terminal needs to switch from the grant-free mode to the grant mode includes: determining, by the terminal when duration starting from a time when the first data is initially transmitted for the first time reaches a preset duration threshold and no acknowledge frame returned by the network device for the first data is received, that the terminal needs to switch from the grant-free mode to the grant mode. In this way, when the duration starting after the terminal initially transmits the first data to the network device reaches the duration threshold and no acknowledge frame returned by the network device is received, the terminal can fall back to the grant mode in a timely manner. This improves reliability of initial data transmission from the terminal to the network device.

Optionally, that the terminal needs to switch from the grant-free mode to the grant mode includes: receiving, by the terminal, an acknowledge frame sent by the network device; obtaining first instruction information that is included in the acknowledge frame and used to instruct the terminal to switch from the grant-free mode to the grant mode; and determining, according to the first instruction information, that the terminal needs to switch from the grant-free mode to the grant mode. Because the network device sends the first instruction information to the terminal when determining that the terminal in the grant-free mode needs to switch from the grant-free mode to the grant mode, the terminal may fall back to the grant mode when the terminal needs to switch from the grant-free mode to the grant mode, and transmit data in the grant mode. In this way, reliability of data transmission is improved.

Optionally, that the terminal needs to switch from the grant-free mode to the grant mode includes: receiving, by the terminal, an acknowledge frame sent by the network device; and determining, when determining that a resource used by the acknowledge frame is one of a plurality of preset instruction resources, that the terminal needs to switch from the grant-free mode to the grant mode, where any one of the plurality of preset instruction resources is a resource used to instruct the terminal to switch from the grant-free mode to the grant mode. Because the network device sends the acknowledge frame including instruction information to the terminal when determining that the terminal in the grant-free mode needs to switch from the grant-free mode to the grant mode, to instruct the terminal to switch from the grant-free mode to the grant mode, the terminal falls back to the grant mode and transmits data in the grant mode. In this way, reliability of data transmission is improved.

Optionally, that the terminal needs to switch from the grant-free mode to the grant mode includes: receiving, by the terminal, second instruction information sent by the network device, where the second instruction information includes an identifier of a to-be-switched grant-free resource; and determining, by the terminal when determining that the identifier of the to-be-switched grant-free resource is a resource identifier of a resource used by the terminal to send the first data, that the terminal needs to switch from the grant-free mode to the grant mode. Because the network device sends the second instruction information to the terminal when determining that the terminal in the grant-free mode needs to switch from the grant-free mode to the grant mode, to instruct the terminal to switch from the grant-free mode to the grant mode, the terminal falls back to the grant mode and transmits data in the grant mode. In this way, reliability of data transmission is improved.

Optionally, before the terminal needs to switch from the grant-free mode to the grant mode, the method further includes: determining, by the terminal, that no acknowledge frame returned by the network device for the first data is received. In this case, a terminal that successfully transmits data in the grant-free mode may not need to fall back to the grant mode, but a terminal that fails to transmit data in the grant-free mode and sends the first data by using the resource corresponding to the identifier that is of the to-be-switched grant-free resource and that is in the second instruction information falls back to the grant mode and transmits data in the grant mode. In this way, reliability of data transmission is improved.

Optionally, after the terminal needs to switch from the grant-free mode to the grant mode, the method further includes: initiating, by the terminal, any one or more of a random access request, a service request, and a scheduling request (SR) to the network device. In this way, after falling back to the grant mode, the terminal can contend for an opportunity to send data in the grant mode.

Optionally, after the initiating, by the terminal, a random access request to the network device, the method further includes: receiving, by the terminal, a random access response fed back by the network device; sending, by the terminal, a service request or a scheduling request to the network device, where the scheduling request is used to apply to the network device for a grant resource; receiving, by the terminal, an identifier that is of the grant resource allocated to the terminal and that is returned by the network device; and sending, by the terminal, the second data on the grant resource. Optionally, the service request sent by the terminal to the network device may be used to apply to the network device for a grant resource, to contend for an opportunity to send data in the grant mode.

Optionally, the initiating, by the terminal, a service request or a scheduling request to the network device includes: sending, by the terminal, the service request or the scheduling request to the network device, where the scheduling request is used to apply to the network device for a grant resource; receiving, by the terminal, an identifier that is of the grant resource allocated to the terminal and that is returned by the network device; and sending, by the terminal, the second data on the grant resource. In this way, after falling back to the grant mode, the terminal can contend for an opportunity to send data in the grant mode. Optionally the service request sent by the terminal to the network device may be used to apply to the network device for a grant resource, to contend for an opportunity to send data in the grant mode.

Optionally, transmission content of the second data and the first data is consistent. This can improve reliability of transmission of the first data.

According to a second aspect, an embodiment of the present disclosure provides a data transmission method, including:

determining, by a network device, that a terminal in a grant-free mode needs to switch from the grant-free mode to a grant mode; and sending, by the network device, instruction information to the terminal, where the instruction information is used to instruct the terminal to switch from the grant-free mode to the grant mode.

Because the network device sends the instruction information to the terminal when determining that the terminal in the grant-free mode needs to switch from the grant-free mode to the grant mode, the terminal may fall back to the grant mode when the terminal needs to switch from the grant-free mode to the grant mode, and transmit data in the grant mode. In this way, reliability of data transmission is improved.

Optionally, before the sending, by the network device, instruction information to the terminal, the method further includes: receiving, by the network device, data sent by the terminal in the grant-free mode by using a grant-free resource; and successfully decoding, by the network device, the data. The sending, by the network device, instruction information to the terminal includes: sending, by the network device, an acknowledge frame for the data to the terminal, where the acknowledge frame includes the instruction information. Because the network device sends the acknowledge frame including the instruction information to the terminal when determining that the terminal in the grant-free mode needs to switch from the grant-free mode to the grant mode, to instruct the terminal to switch from the grant-free mode to the grant mode, the terminal falls back to the grant mode and transmits data in the grant mode. In this way, reliability of data transmission is improved.

Optionally, the instruction information is an identifier of any one of a plurality of preset instruction resources, and the identifier of the any one of the plurality of preset instruction resources is used to instruct the terminal to switch from the grant-free mode to the grant mode. Before the sending, by the network device, instruction information to the terminal, the method further includes: receiving, by the network device, data sent by the terminal in the grant-free mode by using a grant-free resource; and successfully decoding, by the network device, the data. The sending, by the network device, instruction information to the terminal includes: sending, by the network device, an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode. Because the network device sends the acknowledge frame including the instruction information to the terminal when determining that the terminal in the grant-free mode needs to switch from the grant-free mode to the grant mode, to instruct the terminal to switch from the grant-free mode to the grant mode, the terminal falls back to the grant mode and transmits data in the grant mode. In this way, reliability of data transmission is improved.

Optionally, the instruction information includes an identifier of a to-be-switched grant-free resource. Before the sending, by the network device, instruction information to the terminal, the method further includes: determining, by the network device, the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information. Because the network device sends the instruction information to the terminal when determining that the terminal in the grant-free mode needs to switch from the grant-free mode to the grant mode, to instruct the terminal to switch from the grant-free mode to the grant mode, the terminal falls back to the grant mode and transmits data in the grant mode. In this way, reliability of data transmission is improved.

Optionally, the instruction information includes an identifier of a to-be-switched grant-free resource. Before the sending, by the network device, instruction information to the terminal, the method further includes: determining, by the network device, the identifier of the to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information. In this case, a terminal that successfully transmits data in the grant-free mode may not need to fall back to the grant mode, but a terminal that fails to transmit data in the grant-free mode and sends the first data by using the resource corresponding to the identifier that is of the to-be-switched grant-free resource and that is in the second instruction information falls back to the grant mode and transmits data in the grant mode. In this way, reliability of data transmission is improved.

According to a third aspect, an embodiment of the present disclosure provides a terminal, including:

a sending unit, configured to: send, in a grant-free mode, first data to a network device by using a grant-free resource; and send, in a grant mode, second data to the network device by using a grant resource; and a processing unit, configured to send, by using the sending unit in the grant mode by using the grant resource, the second data to the network device when determining that the terminal needs to switch from the grant-free mode to the grant mode.

When the terminal transmits the first data in the grant-free mode, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Optionally, the sending unit is specifically configured to: initially transmit the first data to the network device for the first time in the grant-free mode by using the grant-free resource; and initially transmit the first data to the network device again when no acknowledge frame returned by the network device for the first data initially transmitted for the first time is received within preset first duration; and the processing unit is specifically configured to determine, when determining that a quantity of times the first data is initially transmitted reaches a preset initial transmission times threshold, that the terminal needs to switch from the grant-free mode to the grant mode.

Optionally, the sending unit is specifically configured to initially transmit the first data to the network device for the first time in the grant-free mode by using the grant-free resource; and the processing unit is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the terminal further includes a counter, configured to count a quantity of times the first data is retransmitted. The sending unit is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration; and the processing unit is specifically configured to determine, when a quantity of times the first data is initially transmitted reaches a preset initial transmission times threshold and no acknowledge frame returned by the network device for the first data is received, that the terminal needs to switch from the grant-free mode to the grant mode.

Optionally, the terminal further includes a counter, configured to count a quantity of times the first data is retransmitted. The sending unit is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration; and the processing unit is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally the terminal further includes a receiving unit, configured to receive an acknowledge frame sent by the network device; and the processing unit is specifically configured to: obtain first instruction information that is included in the acknowledge frame and used to instruct the terminal to switch from the grant-free mode to the grant mode; and determine, according to the first instruction information, that the terminal needs to switch from the grant-free mode to the grant mode.

Optionally, the terminal further includes a receiving unit, configured to receive an acknowledge frame sent by the network device. The processing unit is specifically configured to determine, when determining that a resource used by the acknowledge frame is one of a plurality of preset instruction resources, that the terminal needs to switch from the grant-free mode to the grant mode, where any one of the plurality of preset instruction resources is a resource used to instruct the terminal to switch from the grant-free mode to the grant mode.

Optionally, the terminal further includes a receiving unit, configured to receive second instruction information sent by the network device, where the second instruction information includes an identifier of a to-be-switched grant-free resource. The processing unit is specifically configured to determine, when determining that the identifier of the to-be-switched grant-free resource is a resource identifier of a resource used by the terminal to send the first data, that the terminal needs to switch from the grant-free mode to the grant mode.

Optionally, the processing unit is further configured to determine, before the terminal needs to switch from the grant-free mode to the grant mode, that no acknowledge frame returned by the network device for the first data is received.

According to a fourth aspect, an embodiment of the present disclosure provides a network device, including:

a processing unit, configured to determine that a terminal in a grant-free mode needs to switch from the grant-free mode to a grant mode; and a sending unit, configured to send instruction information to the terminal, where the instruction information is used to instruct the terminal to switch from the grant-free mode to the grant mode.

Because the network device sends the instruction information to the terminal when determining that the terminal in the grant-free mode needs to switch from the grant-free mode to the grant mode, the terminal may fall back to the grant mode when the terminal needs to switch from the grant-free mode to the grant mode, and transmit data in the grant mode. In this way, reliability of data transmission is improved.

Optionally, the network device further includes a receiving unit, configured to: before the sending unit sends the instruction information to the terminal, receive data sent by terminal in the grant-free mode by using a grant-free resource, where the processing unit is configured to decode the data; and the sending unit is configured to: when the data is successfully decoded, send an acknowledge frame for the data to the terminal, where the acknowledge frame includes the instruction information.

Optionally, the instruction information is an identifier of any one of a plurality of preset instruction resources, and the identifier of the any one of the plurality of preset instruction resources is used to instruct the terminal to switch from the grant-free mode to the grant mode;

the network device further includes a receiving unit, configured to: before the sending unit sends the instruction information to the terminal, receive data sent by the terminal in the grant-free mode by using a grant-free resource;

the processing unit is configured to decode the data; and the sending unit is configured to: when the data is successfully decoded, send an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode.

Optionally, the instruction information includes an identifier of a to-be-switched grant-free resource. The processing unit is further configured to determine the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information.

Optionally, the instruction information includes an identifier of a to-be-switched grant-free resource. The processing unit is further configured to determine the identifier of the to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information.

According to a fifth aspect, an embodiment of the present disclosure provides a terminal, including:

a transceiver, configured to: send, in a grant-free mode, first data to a network device by using a grant-free resource; and send, in a grant mode, second data to the network device by using a grant resource; and a processor, configured to send, by using the transceiver in the grant mode by using the grant resource, the second data to the network device when determining that the terminal needs to switch from the grant-free mode to the grant mode.

When the terminal transmits the first data in the grant-free mode, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Optionally, the transceiver is specifically configured to: initially transmit the first data to the network device for the first time in the grant-free mode by using the grant-free resource; and initially transmit the first data to the network device again when no acknowledge frame returned by the network device for the first data initially transmitted for the first time is received within preset first duration; and the processor is specifically configured to determine, when determining that a quantity of times the first data is initially transmitted reaches a preset initial transmission times threshold, that the terminal needs to switch from the grant-free mode to the grant mode.

Optionally, the transceiver is specifically configured to initially transmit the first data to the network device for the first time in the grant-free mode by using the grant-free resource; and the processor is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the terminal further includes a counter, configured to count a quantity of times the first data is retransmitted. The transceiver is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration; and the processor is specifically configured to determine, when a quantity of times the first data is initially transmitted reaches a preset initial transmission times threshold and no acknowledge frame returned by the network device for the first data is received, that the terminal needs to switch from the grant-free mode to the grant mode.

Optionally, the terminal further includes a counter, configured to count a quantity of times the first data is retransmitted. The transceiver is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration; and the processor is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the transceiver is further configured to receive an acknowledge frame sent by the network device; and the processor is specifically configured to: obtain first instruction information that is included in the acknowledge frame and used to instruct the terminal to switch from the grant-free mode to the grant mode; and determine, according to the first instruction information, that the terminal needs to switch from the grant-free mode to the grant mode.

Optionally, the transceiver is further configured to receive an acknowledge frame sent by the network device; and the processor is specifically configured to determine, when determining that a resource used by the acknowledge frame is one of a plurality of preset instruction resources, that the terminal needs to switch from the grant-free mode to the grant mode, where any one of the plurality of preset instruction resources is a resource used to instruct the terminal to switch from the grant-free mode to the grant mode.

Optionally, the transceiver is further configured to receive second instruction information sent by the network device, where the second instruction information includes an identifier of a to-be-switched grant-free resource; and the processor is specifically configured to determine, when determining that the identifier of the to-be-switched grant-free resource is a resource identifier of a resource used by the terminal to send the first data, that the terminal needs to switch from the grant-free mode to the grant mode.

Optionally, the processor is further configured to determine, before the terminal needs to switch from the grant-free mode to the grant mode, that no acknowledge frame returned by the network device for the first data is received.

According to a sixth aspect, an embodiment of the present disclosure provides a network device, including:

a processor, configured to determine that a terminal in a grant-free mode needs to switch from the grant-free mode to a grant mode; and a transceiver, configured to send instruction information to the terminal, where the instruction information is used to instruct the terminal to switch from the grant-free mode to the grant mode.

Because the network device sends the instruction information to the terminal when determining that the terminal in the grant-free mode needs to switch from the grant-free mode to the grant mode, the terminal may fall back to the grant mode when the terminal needs to switch from the grant-free mode to the grant mode, and transmit data in the grant mode. In this way, reliability of data transmission is improved.

Optionally, the network device further includes the transceiver, configured to: before sending the instruction information to the terminal, receive data sent by the terminal in the grant-free mode by using a grant-free resource; and when the processor successfully decodes the data, send an acknowledge frame for the data to the terminal, where the acknowledge frame includes the instruction information.

Optionally, the instruction information is an identifier of any one of a plurality of preset instruction resources, and the identifier of the any one of the plurality of preset instruction resources is used to instruct the terminal to switch from the grant-free mode to the grant mode; and the transceiver is configured to: before sending the instruction information to the terminal, receive data sent by the terminal in the grant-free mode by using a grant-free resource; and when the processor successfully decodes the data, send an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode.

Optionally, the instruction information includes an identifier of a to-be-switched grant-free resource. The processor is further configured to determine the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information.

Optionally, the instruction information includes an identifier of a to-be-switched grant-free resource. The processor is further configured to determine the identifier of the to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information.

In the embodiments of the present disclosure, the terminal sends, in the grant-free mode, the first data to the network device by using the grant-free resource, and if the terminal needs to switch from the grant-free mode to the grant mode, the terminal sends, in the grant mode, the second data to the network device by using the grant resource. When the terminal transmits the first data in the grant-free mode, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

BRIEF DESCRIPTION OF THE DRAWINGS

To describe the technical solutions in the embodiments of the present disclosure more clearly, the following briefly describes the accompanying drawings required for describing the embodiments.

DETAILED DESCRIPTION

To make the objectives, technical solutions, and beneficial effects of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

It should be understood that, the technical solutions in the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G communications system.

Figures 1, 2:
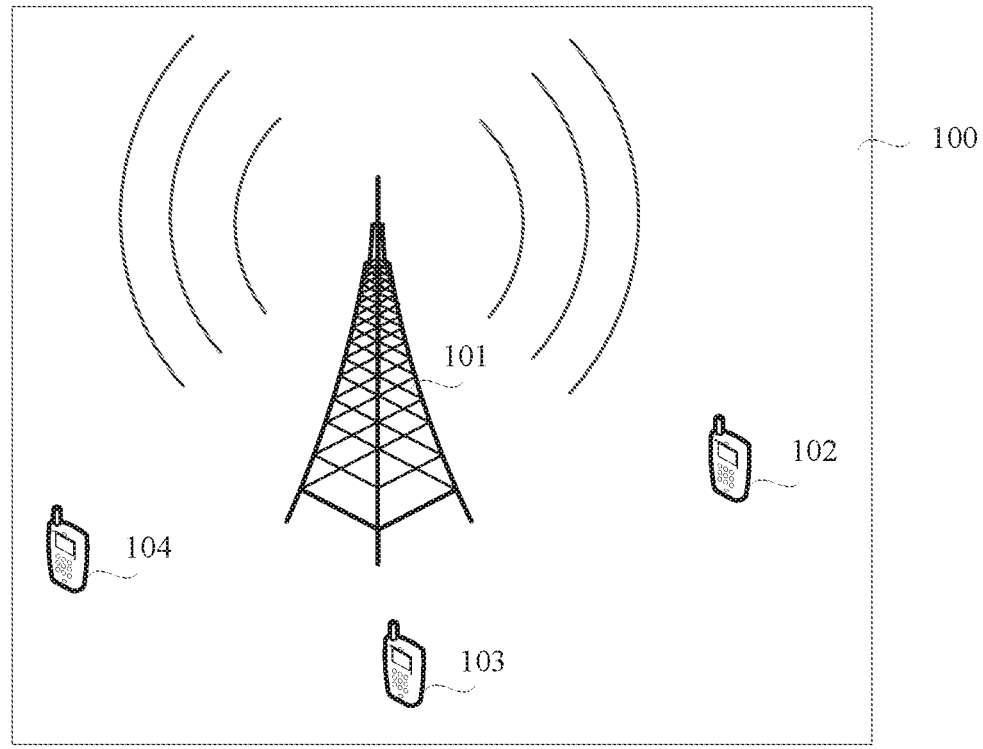
FIG. 1 is a schematic architectural diagram of a communications systems according to an embodiment of the present disclosure.
FIG. 2 is a schematic flowchart of a data transmission method according to an embodiment of the present disclosure.

FIG. 1 is a schematic architectural diagram of a communications system to which an embodiment of the present disclosure is applied. As shown in FIG. 1, the communications system 100 may include a network device 101 and at least one terminal, for example, a terminal 102, a terminal 103, and a terminal 104. The terminals 102 to 104 are connected by using a wireless connection or a wired connection or in another manner.

The terminals 102 to 104 may communicate with one or more core networks by using a radio access network (RAN). A terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

The network device 101 may be a device configured to communicate with the terminal device. For example, the network device 101 may be a base transceiver station (BTS) in a GSM system or a CDMA system, or may be a NodeB (NB) in a WCDMA system. Alternatively, the network device 101 may be an evolved NodeB (eNB or eNodeB) in an LTE system, or may be a relay station, an access point, an in-vehicle device, a wearable device, a network side device in a future 5G network, a network device in a future evolved PLMN network, or the like. Alternatively, the network device 101 may be another network device with a function similar to that of a base station, or may be a terminal. For example, in D2D communication, a terminal that serves as a transmitter functions as a network device.

Based on the system architecture shown in FIG. 1, FIG. 2 is a schematic flowchart of a data transmission method according to an embodiment of the present disclosure. As shown in FIG. 2, the data transmission method implemented by a terminal provided in this embodiment of the present disclosure includes:

Step 201: The terminal sends, in a grant-free mode, first data to a network device by using a grant-free resource.

Step 202: if the terminal needs to switch from the grant-free mode to a grant mode, the terminal sends, in the grant mode, second data to the network device by using a grant resource.

Optionally, the first data and the second data may be the same or may be different. In other words, the terminal may succeed or fail in sending of the first data, and when switching from the grant-free mode to the grant mode, the terminal may send the first data or may send new data.

When the terminal transmits the first data in the grant-free mode, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

In this embodiment of the present disclosure, when the terminal needs to switch from the grant-free mode to the grant mode, there are two implementations: In a first implementation, the terminal triggers the terminal to switch from the grant-free mode to the grant mode; in a second implementation, the network device triggers the terminal to switch from the grant-free mode to the grant mode. The following provides detailed descriptions by using the following first implementation and second implementation. For the first implementation, two manners of transmitting data by the terminal are described by using the following manner 1 and manner 2.

Manner 1

Figure 2A:
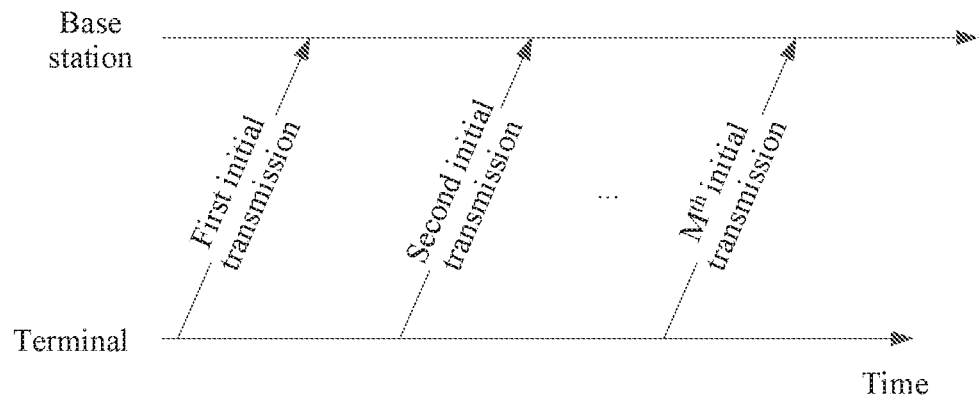
FIG. 2a is a schematic diagram of a method for transmitting data by a terminal according to an embodiment of the present disclosure.

FIG. 2a is a schematic diagram of a method for transmitting data by a terminal according to an embodiment of the present disclosure. As shown in FIG. 2a, the terminal is in a grant-free mode, and the terminal transmits data by using a grant-free resource. When a HARQ technology is not used, the terminal initially transmits the data for the first time. If no acknowledge (ACK) frame returned by the network device is received, the terminal initially transmits the data for the second time. If still no acknowledge frame returned by the network device is received, the terminal initially transmits the data again. For example, the terminal initially transmits the same data for M times by using a grant-free resource, where M is an integer greater than or equal to 2.

In other words, the terminal initially transmits the data for the first time, and if no acknowledge frame returned by the network device is received, the terminal initially transmits the data again. In this embodiment of the present disclosure, the first initial transmission of the data and the second initial transmission of the data are two independent processes. Optionally, the network device may perform separate decoding based on the data initially transmitted each time. For example, the network device may perform separate decoding based on the data initially transmitted for the first time, and if the decoding fails, the network device receives the data initially transmitted by the terminal for the second time, and the network device performs separate decoding based on the data initially transmitted for the second time.

During specific implementation, in any two of the M initial transmissions of the data, optionally, modulation and coding schemes may be the same or may be different; optionally, used grant-free resources may be the same, or may be different, or some of used grant-free resources may be the same. For example, a grant-free resource includes a pilot resource and a time-frequency resource. Same pilot resources and same time-frequency resources are used in the two initial transmissions; or different pilot resources and different time-frequency resources are used in the two initial transmissions; or different pilot resources and same time-frequency resources are used in the two initial transmissions.

Manner 2

Figure 2B:
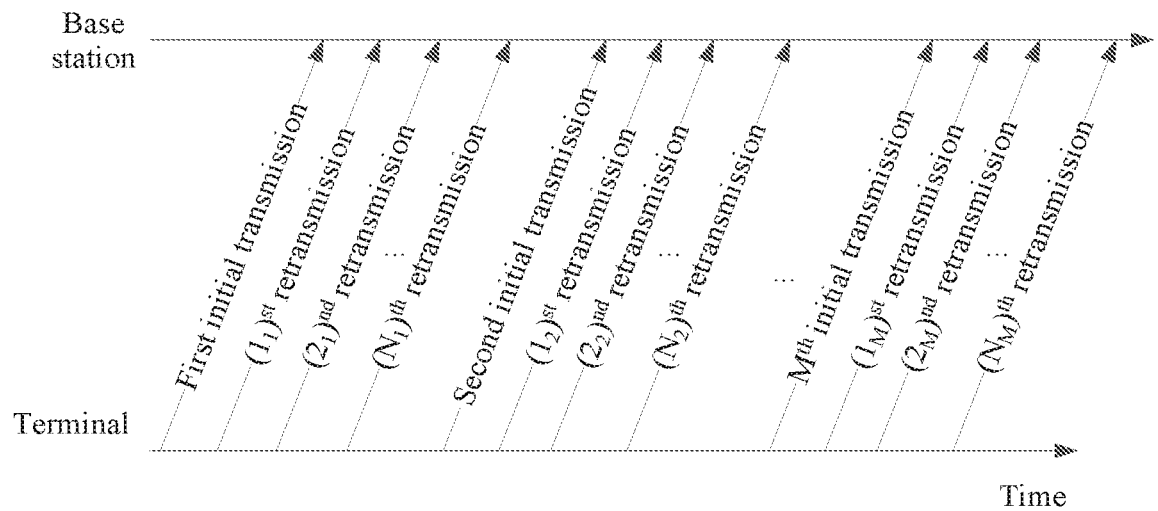
FIG. 2b is a schematic diagram of another method for transmitting data by a terminal according to an embodiment of the present disclosure.

FIG. 2b is a schematic diagram of another method for transmitting data by a terminal according to an embodiment of the present disclosure. As shown in FIG. 2b, the terminal is in a grant-free mode, and the terminal transmits data by using a grant-free resource. When a HARQ technology is used, the terminal initially transmits the data for the first time. If no acknowledge frame returned by the network device is received, the terminal retransmits the data for the first time in the first initial transmission process. This is indicated as a $(1_1)^{st}$ retransmission in FIG. 2b. If no acknowledge frame returned by the network device is received, the terminal retransmits the data for the second time in the first initial transmission process. This is indicated as a $(2_1)^{nd}$ retransmission in FIG. 2b. For example, if N retransmissions are performed in the first initial transmission process, an $N^{th}$ retransmission in the first initial transmission process is indicated as an $(N_1)^{th}$ retransmission in FIG. 2b. Similarly, the terminal initially transmits the same data for M times by using a grant-free resource, where M is an integer greater than or equal to 2. A first retransmission in an $M^{th}$ initial transmission process is indicated as a $(1_M)^{st}$ retransmission, and an $N^{th}$ retransmission in the $M^{th}$ initial transmission process is indicated as an $(N_M)^{th}$ retransmission.

As shown in FIG. 2b, retransmitted data is a redundancy version of data in an initial transmission process. For example, data in the $(1_1)^{st}$ retransmission is a redundancy version of the data in the first initial transmission. The network device may perform combined decoding based on the data in the first initial transmission and the $(1_1)^{st}$ retransmission to the $(N_1)^{st}$ transmission, to improve a probability that data decoding succeeds. Similarly, the network device may perform combined decoding based on the data in the $M^{th}$ initial transmission and the $(1_M)^{st}$ retransmission to the $(N_M)^{th}$ retransmission, to improve a probability that data decoding succeeds. Optionally, any two initial transmission processes are two mutually independent processes. For example, a first initial transmission of data and a second initial transmission of the data are mutually independent processes.

During specific implementation, in any two of the M initial transmissions of the data, optionally, modulation and coding schemes may be the same or may be different; optionally, used grant-free resources may be the same, or may be different, or some of used grant-free resources may be the same. For example, a grant-free resource includes a pilot resource and a time-frequency resource. Same pilot resources and same time-frequency resources are used in the two initial transmissions; or different pilot resources and different time-frequency resources are used in the two initial transmissions; or different pilot resources and same time-frequency resources are used in the two initial transmissions.

In the first implementation, the terminal triggers the terminal to switch from the grant-free mode to the grant mode.

Descriptions are provided with reference to the foregoing manner 1 and manner 2. In this implementation, there are a plurality of implementations in which the terminal triggers the terminal to switch from the grant-free mode to the grant mode. Descriptions are provided by using some optional implementations, such as the following Embodiment a1, Embodiment a2, Embodiment a3, and Embodiment a4. In the following content, a concept of initial data transmission and a concept of data retransmission are the same as those in the foregoing manner 1 and manner 2. Details are not described herein again.

Embodiment a1

Optionally, that the terminal sends, in a grant-free mode, first data to a network device by using a grant-free resource includes: initially transmitting, by the terminal, the first data to the network device for the first time in the grant-free mode by using the grant-free resource; and initially transmitting, by the terminal, the first data to the network device again when no acknowledge frame returned by the network device for the first data initially transmitted for the first time is received within preset first duration. The first initial transmission of the first data and the second initial transmission of the first data are mutually independent. For related descriptions about the initial transmission process, refer to the content in the foregoing manner 1 and manner 2. That the terminal needs to switch from the grant-free mode to the grant mode includes: determining, by the terminal when determining that a quantity of times the first data is initially transmitted reaches a preset initial transmission times threshold, that the terminal needs to switch from the grant-free mode to the grant mode. In this way, when the terminal fails, for a plurality of times, to initially transmit data to the network device, the terminal can fall back to the grant mode in a timely manner. This improves reliability of initial data transmission from the terminal to the network device.

Specifically, a timer in this embodiment of the present disclosure may also be referred to as a timing device. Preset duration corresponding to the timer may be set. When the preset duration ends, the timer can issue an alert. Alternatively, for example, if the preset duration is set to five milliseconds, after the timer is reset, a time displayed on the timer is five milliseconds, and the timer shortens, based on an event, the time displayed on the timer, and issues an alert when the time displayed on the timer is 0. A counter in this embodiment of the present disclosure may perform counting, may display a counted value, or may issue an alert, and so on. In another optional implementation, the counter may warn after the counter counts to a preset value. All of a first timer, a second timer, a third timer, a fourth timer, a first counter, a second counter, and the like in this embodiment of the present disclosure are timers. The "first", "second", "third", and "fourth" are merely used for differentiation, and do not impose a limitation.

Figure 2C:
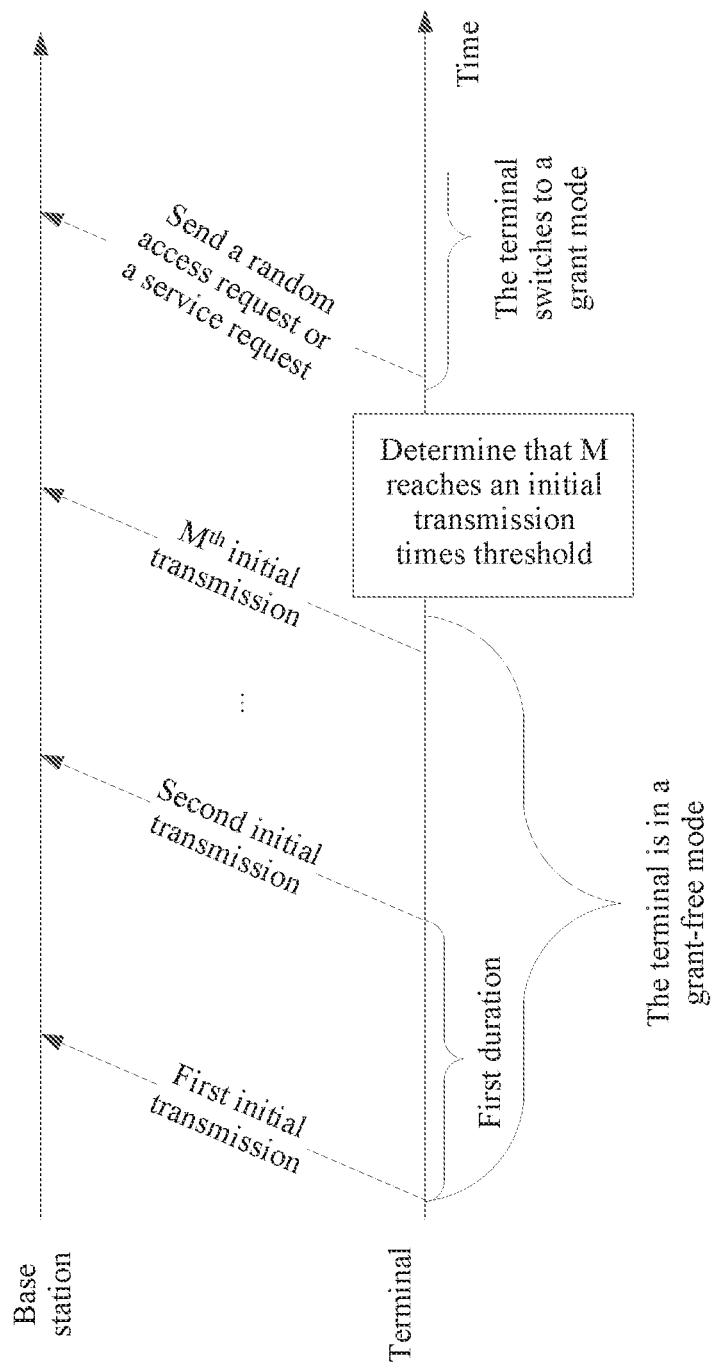
FIG. 2c is a schematic diagram of a method for switching a terminal from a grant-free mode to a grant mode according to an embodiment of the present disclosure.

FIG. 2c is a schematic diagram of a method for switching a terminal from a grant-free mode to a grant mode according to an embodiment of the present disclosure. As shown in FIG. 2c, optionally, a first timer is used for timing and a first counter is used for counting. The terminal is in the grant-free mode. The terminal initially transmits first data for the first time. The terminal sets the first counter to 1, and resets the first timer to start timing. When the terminal determines that a value of the counter is less than an initial transmission times threshold and no acknowledge frame returned by the network device for the first data initially transmitted for the first time is received within preset first duration, the terminal initially transmits the first data to the network device again. In other words, the terminal initially transmits the first data for the second time, increases the value of the first counter by 1, and resets the first timer again to start timing. For example, after the terminal initially transmits the first data for the $M^{th}$ time, the value of the first counter has increased to M. If the terminal determines that a value of M is equal to the initial transmission times threshold, the terminal determines to switch from the grant-free mode to the grant mode.

Optionally, after the terminal needs to switch from the grant-free mode to the grant mode, the terminal initiates any one or more of a random access request, a service request, and a scheduling request to the network device.

In a possible implementation, when the terminal switches to the grant mode, the terminal may be in an idle mode. In this case, the terminal needs to send a random access request to the network device, so that the terminal sets up a connection to the network device. Specifically, the terminal may send a random access preamble to the network device. Optionally, after the terminal initiates the random access request to the network device, the terminal receives a random access response fed back by the network device; the terminal sends a service request or a scheduling request to the network device, where the scheduling request is used to apply to the network device for a grant resource; the terminal receives an identifier that is of the grant resource allocated to the terminal and that is returned by the network device; and the terminal sends second data on the grant resource. Optionally, the service request sent by the terminal to the network device may be used to apply to the network device for a grant resource, to contend for an opportunity to send data in the grant mode.

In another possible implementation, when the terminal switches to the grant mode, the terminal has set up an RRC connection to the network device. In this case, the terminal sends a service request or a scheduling request to the network device, to request to send data in the grant mode. Optionally, the terminal sends a service request or a scheduling request to the network device, where the scheduling request is used to apply to the network device for a grant resource; the terminal receives an identifier that is of the grant resource allocated to the terminal and that is returned by the network device; and the terminal sends second data on the grant resource. Optionally, the network device configures a grant resource for the terminal that switches from the grant-free mode to the grant mode. The grant resource is used by the terminal that switches from the grant-free mode to the grant mode, to send data to the network device. Optionally, the service request sent by the terminal to the network device may be used to apply to the network device for a grant resource, to contend for an opportunity to send data in the grant mode.

Optionally, the terminal sends the second data after the terminal switches from the grant-free mode to the grant mode. The first data and the second data may be the same or may be different. To be specific, if the terminal determines that after the first data is initially transmitted for the $M^{th}$ time, an acknowledge frame returned by the network device for the first data initially transmitted for the $M^{th}$ time is received within preset first duration, the terminal may send, after switching to the grant mode, other data by using a grant resource. Optionally, if the terminal determines that after the first data is initially transmitted for the $M^{th}$ time, no acknowledge frame returned by the network device for the first data initially transmitted for the $M^{th}$ time is received within preset first duration, the terminal may send, after switching to the grant mode, other data by using a grant resource, or may still send the first data by using a grant resource.

Optionally, in Embodiment a1, that the terminal initially transmits the first data for the first time and the terminal initially transmits the first data again is specifically initial transmission processes in the first initial transmission, the second initial transmission, and the $M^{th}$ initial transmission performed by the terminal in FIG. 2a and FIG. 2b. In FIG. 2c, the first data may be retransmitted or may not be retransmitted after the first data is initially transmitted for the first time and before the first data is initially transmitted for the second time. This is determined by the terminal. If the first data is retransmitted, for example, the first data is retransmitted after the first data is initially transmitted for the first time, the retransmitted data is a redundancy version of the first data initially transmitted for the first time. The network device may perform combined decoding based on the first data initially transmitted for the first time and the redundancy version that is of the first data and that is retransmitted after the first data is initially transmitted for the first time and before the first data is initially transmitted for the second time. For related descriptions about the initial transmission and the retransmission, refer to the descriptions in the foregoing manner 1 and manner 2. Optionally, in Embodiment a1, that the terminal initially transmits the first data for the first time and the terminal initially transmits the first data again may be initial transmission processes and retransmissions in the first initial transmission, the second initial transmission, and the $M^{th}$ initial transmission performed by the terminal in FIG. 2a and FIG. 2b. For example, the terminal initially transmits the first data to the network device for the first time in the grant-free mode by using the grant-free resource, and the terminal determines, when determining that a quantity of times the first data is initially transmitted to the network device reaches an initial transmission times threshold, that the terminal needs to switch from the grant-free mode to the grant mode. The quantity of times the first data is initially transmitted to the network device includes a quantity of times the first data is initially transmitted and retransmitted by the terminal to the network device. In other words, when the terminal initially transmits the first data once, the value of the first counter increases by 1, and when the terminal retransmits the first data once, the value of the first counter also increases by 1.

Optionally, the first duration may be a constant value, or may be a variable value. For example, the first duration may be a parameter related to an identity (ID) of the terminal, a quantity of times the data is initially transmitted, and the like. In a possible implementation, the first duration increases with the quantity of times the data is initially transmitted. For example, first duration between the first initial transmission and the second initial transmission is less than first duration between the second initial transmission and a third initial transmission. Optionally, the first duration is greater than preset duration for returning an acknowledge frame by the network device. The duration for returning an acknowledge frame by the network device starts from a time when the terminal sends the first data and ends with a time when the terminal receives an acknowledge frame returned by the network device for the first data sent this time. After a structure of a data frame is fixed, the duration for returning an acknowledge frame by the network device is usually a constant value as well. For example, a latency of an acknowledge frame in an existing Long Term Evolution frequency division duplex (LTE FDD) system is defined as a length of four subframes, that is, 4 ms.

Embodiment a2

Optionally, that the terminal sends, in a grant-free mode, first data to a network device by using a grant-free resource includes: initially transmitting, by the terminal, the first data to the network device for the first time in the grant-free mode by using the grant-free resource; retransmitting, by the terminal, the first data to the network device when no acknowledge frame returned by the network device for the first data is received within preset second duration, and counting, by using a counter, a quantity of times the first data is retransmitted; and initially transmitting, by the terminal, the first data again if the terminal determines that a value of the counter increases to a preset retransmission times threshold and determines that no acknowledge frame returned by the network device for the first data is received within preset third duration. That the terminal needs to switch from the grant-free mode to the grant mode includes: determining, by the terminal when a quantity of times the first data is initially transmitted reaches a preset initial transmission times threshold and no acknowledge frame returned by the network device for the first data is received, that the terminal needs to switch from the grant-free mode to the grant mode. The first initial transmission of the first data and the second initial transmission of the first data are mutually independent. For related descriptions about the initial transmission process and the retransmission process, refer to the content in the foregoing manner 1 and manner 2.

In this way, when the duration starting after the terminal initially transmits the first data to the network device reaches the duration threshold and no acknowledge frame returned by the network device is received, the terminal can fall back to the grant mode in a timely manner. This improves reliability of initial data transmission from the terminal to the network device.

Figure 2D:
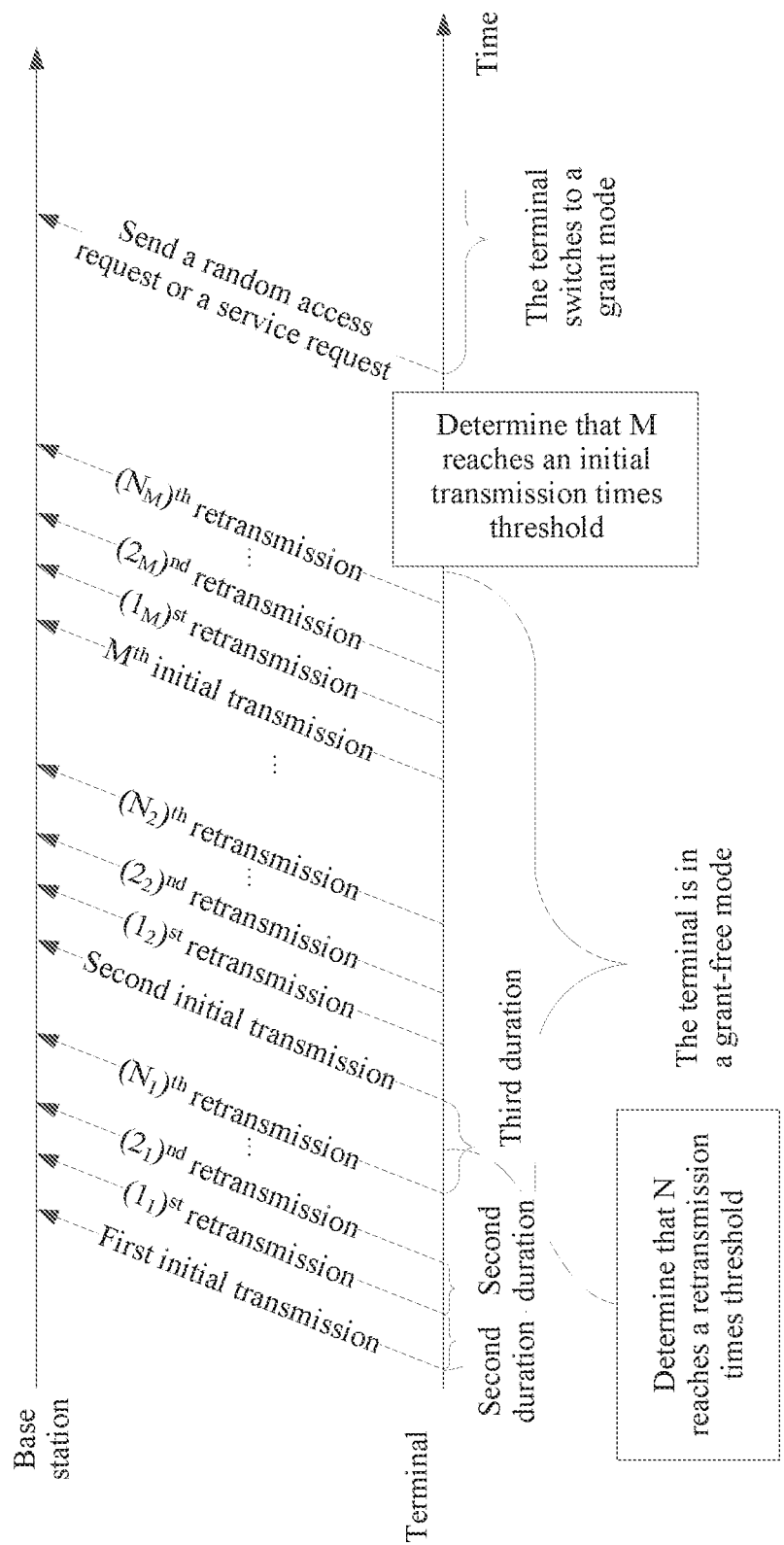
FIG. 2d is a schematic diagram of another method for switching a terminal from a grant-free mode to a grant mode according to an embodiment of the present disclosure.

FIG. 2d is a schematic diagram of another method for switching a terminal from a grant-free mode to a grant mode according to an embodiment of the present disclosure. As shown in FIG. 2d, optionally, a second timer and a third timer are used for timing and a first counter and a second counter are used for counting. The terminal is in the grant-free mode. The terminal initially transmits first data for the first time. The terminal sets the first counter to 1, and resets the second timer to start timing. When no acknowledge frame returned by the network device for the first data initially transmitted for the first time is received within preset second duration, the terminal retransmits the first data to the network device for the first time, and sets the second counter to 1. When the terminal determines, by using the second timer, that no acknowledge frame returned by the network device for the first data is received within the second duration and determines that a value of the second counter is less than a retransmission times threshold, the terminal retransmits the first data again, and increases the value of the second counter by 1. For example, after N retransmissions, when it is determined that no acknowledge frame returned by the network device for the first data is received within the second duration after an $(N_1)^{st}$ retransmission, and the value of the second counter is equal to the retransmission times threshold, the third timer is started, and the third timer is reset to start timing. When it is determined, by using the third timer, that no acknowledge frame returned by the network device is received within third duration after the $(N_1)^{st}$ retransmission, the first data is initially transmitted again. In other words, the terminal initially transmits the first data for the second time, increases a value of the first counter by 1, and resets the second timer again to start timing. For example, if the terminal initially transmits the first data for the $M^{th}$ time, performs N retransmissions in the $M^{th}$ initial transmission process, and the terminal receives, within the third duration after the terminal performs an $(N_M)^{th}$ retransmission, no acknowledge frame returned by the network device, the terminal determines to switch from the grant-free mode to the grant mode.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

Optionally, the terminal sends the second data after the terminal switches from the grant-free mode to the grant mode. The first data and the second data may be the same or may be different. To be specific, if the terminal determines that after the first data is initially transmitted for the $M^{th}$ time, an acknowledge frame returned by the network device for the first data initially transmitted for the $M^{th}$ time is received within preset first duration, the terminal may send, after switching to the grant mode, other data by using a grant resource. Optionally, if the terminal determines that after the first data is initially transmitted for the $M^{th}$ time, no acknowledge frame returned by the network device for the first data initially transmitted for the $M^{th}$ time is received within preset first duration, the terminal may send, after switching to the grant mode, other data by using a grant resource, or may still send the first data by using a grant resource.

Optionally, in Embodiment a2, that the terminal initially transmits the first data for the first time and the terminal initially transmits the first data again is specifically initial transmission processes in the first initial transmission, the second initial transmission, and the $M^{th}$ initial transmission performed by the terminal in FIG. 2a and FIG. 2b.

Optionally, the second duration may be less than the first duration.

Optionally, the second duration may be a constant value, or may be a variable value. For example, the second duration may be a parameter related to an identity (ID) of the terminal, a quantity of times the data is retransmitted, and the like. In a possible implementation, the second duration increases with the quantity of retransmissions. For example, second duration between the first retransmission and the second retransmission is less than second duration between the second retransmission and a third retransmission. Optionally, the second duration is greater than preset duration for returning an acknowledge frame by the network device. The duration for returning an acknowledge frame by the network device starts from a time when the terminal sends the first data and ends with a time when the terminal receives an acknowledge frame returned by the network device for the first data sent this time. After a structure of a data frame is fixed, the duration for returning an acknowledge frame by the network device is usually a constant value as well. For example, a latency of an acknowledge frame in an LTE FDD system is defined as a length of four subframes, that is, 4 ms.

Optionally, the third duration may be equal to the first duration in Embodiment a1, or may be equal to the second duration in Embodiment a2. Optionally, the third duration may be a constant value, or may be a variable value. For example, the third duration may be a parameter related to an identity (ID) of the terminal, a quantity of times the data is retransmitted, and the like. In a possible implementation, the third duration increases with the quantity of initial transmissions. Details of the third duration may be similar to those of the first duration in Embodiment a1. Details are not described herein again.

Embodiment a3

Optionally, that the terminal sends, in a grant-free mode, first data to a network device by using a grant-free resource includes: initially transmitting, by the terminal, the first data to the network device for the first time in the grant-free mode by using the grant-free resource. That the terminal needs to switch from the grant-free mode to the grant mode includes: determining, by the terminal when duration starting from a time when the first data is initially transmitted for the first time reaches a preset duration threshold and no acknowledge frame returned by the network device for the first data is received, that the terminal needs to switch from the grant-free mode to the grant mode. In this way, when the duration starting after the terminal initially transmits the first data to the network device for the first time reaches the duration threshold and no acknowledge frame returned by the network device is received, the terminal can fall back to the grant mode in a timely manner. This improves reliability of data transmission from the terminal to the network device. The first initial transmission of the first data and the second initial transmission of the first data are mutually independent. For related descriptions about the initial transmission process and a retransmission process, refer to the content in the foregoing manner 1 and manner 2.

Figure 2E:
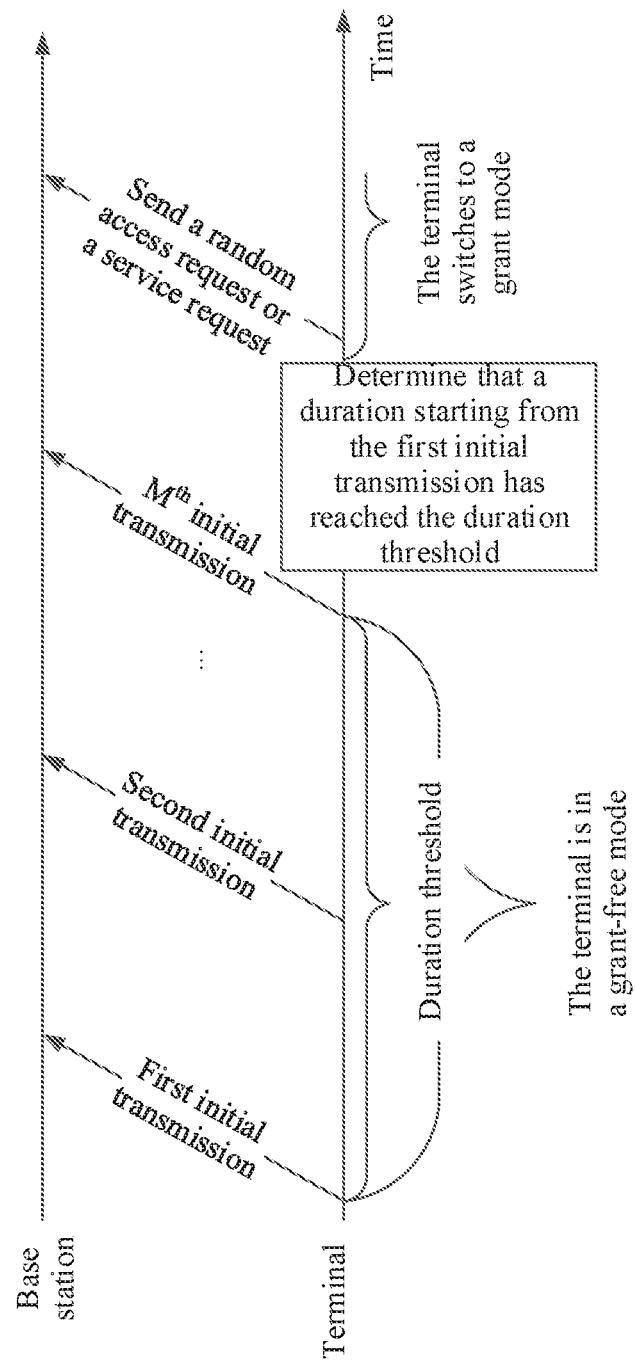
FIG. 2e is a schematic diagram of another method for switching a terminal from a grant-free mode to a grant mode according to an embodiment of the present disclosure.

FIG. 2e is a schematic diagram of another method for switching a terminal from a grant-free mode to a grant mode according to an embodiment of the present disclosure. As shown in FIG. 2e, optionally, a fourth timer is used for timing. The terminal is in the grant-free mode. The terminal initially transmits first data for the first time, and resets the fourth timer to start timing. When the terminal determines, by using the fourth timer, that a duration starting from a time when the first data is initially transmitted for the first time reaches a duration threshold and no acknowledge frame returned by the network device is received within the preset duration threshold, the terminal determines to switch from the grant-free mode to the grant mode.

Specifically, after initially transmitting the first data for the first time, the terminal may use or may not use a HARQ technology. FIG. 2e shows a solution in which the HARQ technology is not used. To be specific, after the terminal initially transmits the first data and determines that no acknowledge frame fed back by the network device is received, the terminal initially transmits the first data to the network device again. The terminal may initially transmit the first data to the network device for a plurality of times. When the terminal determines, by using the fourth timer, that the time starting from the time when the first data is initially transmitted for the first time reaches the duration threshold and no acknowledge frame returned by the network device is received within the preset duration threshold, the terminal determines to switch from the grant-free mode to the grant mode. Alternatively, the terminal uses the HARQ technology. The terminal retransmits the first data by using a retransmission technology. The terminal may initially transmit the first data to the network device for a plurality of times, and retransmit the first data for a plurality of times. When the terminal determines, by using the fourth timer, that the time starting from the time when the first data is initially transmitted for the first time reaches the duration threshold and no acknowledge frame returned by the network device is received within the preset duration threshold, the terminal determines to switch from the grant-free mode to the grant mode.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

Optionally, the terminal sends the second data after the terminal switches from the grant-free mode to the grant mode. The first data and the second data may be the same or may be different. To be specific, if the terminal determines that after the first data is initially transmitted for the $M^{th}$ time, an acknowledge frame returned by the network device for the first data initially transmitted for the $M^{th}$ time is received within preset first duration, the terminal may send, after switching to the grant mode, other data by using a grant resource. Optionally, if the terminal determines that after the first data is initially transmitted for the $M^{th}$ time, no acknowledge frame returned by the network device for the first data initially transmitted for the $M^{th}$ time is received within preset first duration, the terminal may send, after switching to the grant mode, other data by using a grant resource, or may still send the first data by using a grant resource.

Embodiment a4

Optionally, that the terminal sends, in a grant-free mode, first data to a network device by using a grant-free resource includes: initially transmitting, by the terminal, the first data to the network device for the first time in the grant-free mode by using the grant-free resource; retransmitting, by the terminal, the first data to the network device when no acknowledge frame returned by the network device for the first data is received within preset second duration, and counting, by using a counter, a quantity of times the first data is retransmitted; and initially transmitting, by the terminal, the first data again if the terminal determines that a value of the counter increases to a preset retransmission times threshold and determines that no acknowledge frame returned by the network device for the first data is received within preset third duration. That the terminal needs to switch from the grant-free mode to the grant mode includes: determining, by the terminal when duration starting from a time when the first data is initially transmitted for the first time reaches a preset duration threshold and no acknowledge frame returned by the network device for the first data is received, that the terminal needs to switch from the grant-free mode to the grant mode. The first initial transmission of the first data and the second initial transmission of the first data are mutually independent. For related descriptions about the initial transmission process and the retransmission process, refer to the content in the foregoing manner 1 and manner 2.

In this way, when the duration starting after the terminal initially transmits the first data to the network device reaches the duration threshold and no acknowledge frame returned by the network device is received, the terminal can fall back to the grant mode in a timely manner. This improves reliability of data transmission from the terminal to the network device. In this process, a HARQ technology is used, and this can further improve the reliability of the data transmission.

Figure 2F:
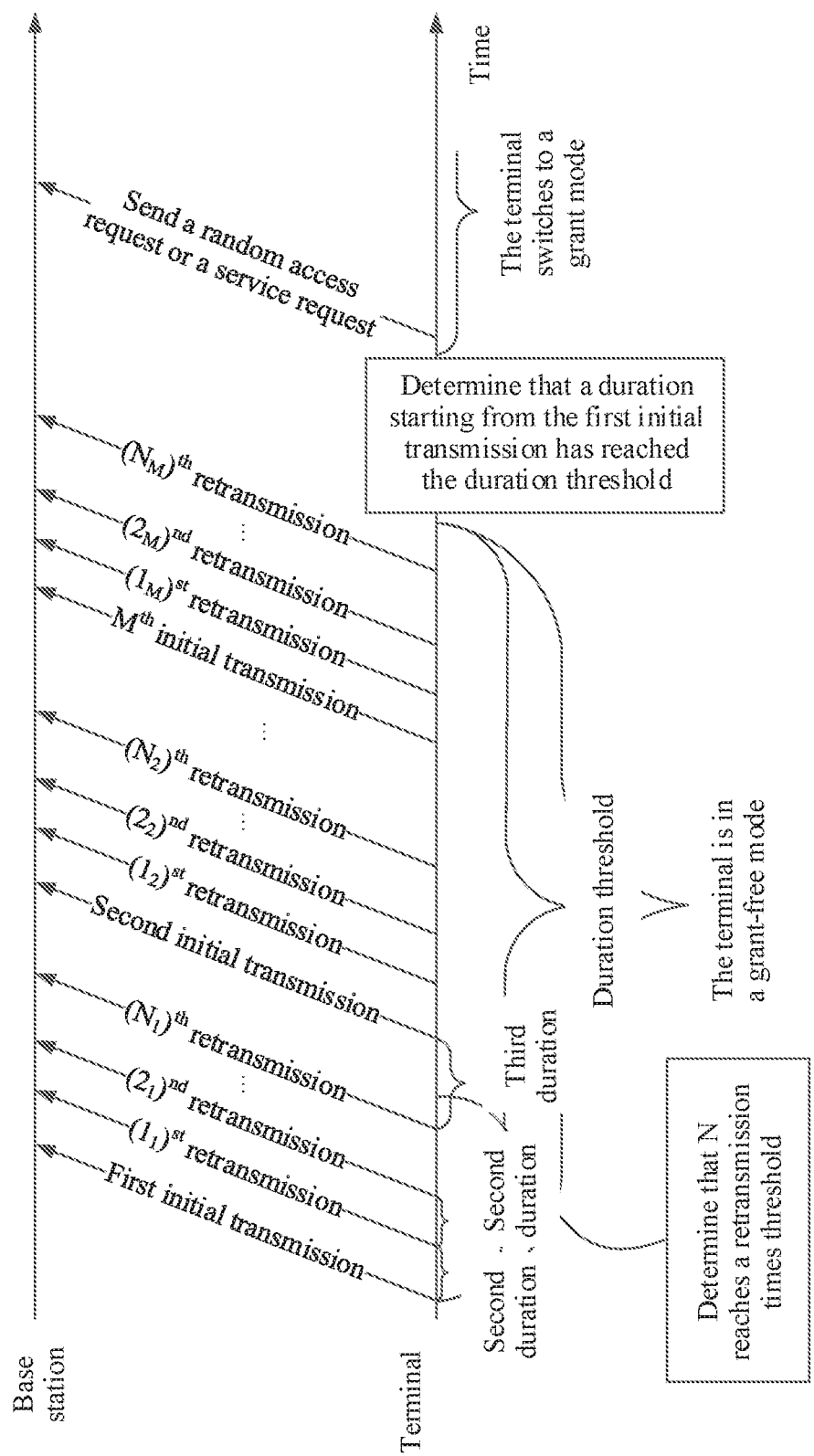
FIG. 2f is a schematic diagram of another method for switching a terminal from a grant-free mode to a grant mode according to an embodiment of the present disclosure.

FIG. 2f is a schematic diagram of another method for switching a terminal from a grant-free mode to a grant mode according to an embodiment of the present disclosure. As shown in FIG. 2f, optionally, a second timer, a third timer, and a fourth timer are used for timing and a second counter is used for counting. The terminal is in the grant-free mode. The terminal initially transmits first data for the first time. The terminal separately resets the second timer and the fourth timer to start timing. When the terminal determines, by using the second timer, that no acknowledge frame returned by the network device for the first data initially transmitted for the first time is received within preset second duration, the terminal retransmits the first data to the network device for the first time, and sets the second counter to 1. When the terminal determines, by using the second timer, that no acknowledge frame returned by the network device for the first data is received within the second duration and determines that a value of the second counter is less than a retransmission times threshold, the terminal retransmits the first data again, and increases the value of the second counter by 1. For example, after N retransmissions, when it is determined that no acknowledge frame returned by the network device for the first data is received within the second duration after an $(N_1)^{st}$ retransmission, and the value of the second counter is equal to the retransmission times threshold, the third timer is started, and the third timer is reset to start timing. When it is determined, by using the third timer, that no acknowledge frame returned by the network device is received within third duration after the $(N_1)^{st}$ retransmission, the first data is initially transmitted again. In other words, the terminal initially transmits the first data for the second time, and resets the second timer again to start timing. For example, if the first data is initially transmitted for the $M^{th}$ time, N retransmissions are performed in the $M^{th}$ initial transmission process, and after the terminal performs $(N_M)^{th}$ retransmission, the terminal determines that a duration, displayed on the fourth timer, starting from a time when the first data is initially transmitted for the first time reaches a duration threshold and no acknowledge frame returned by the network device for the first data is received, the terminal determines that the terminal needs to switch from the grant-free mode to the grant mode.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

Optionally, the terminal sends the second data after the terminal switches from the grant-free mode to the grant mode. The first data and the second data may be the same or may be different. To be specific, if the terminal determines that after the first data is initially transmitted for the $M^{th}$ time, an acknowledge frame returned by the network device for the first data initially transmitted for the $M^{th}$ time is received within preset first duration, the terminal may send, after switching to the grant mode, other data by using a grant resource. Optionally, if the terminal determines that after the first data is initially transmitted for the $M^{th}$ time, no acknowledge frame returned by the network device for the first data initially transmitted for the $M^{th}$ time is received within preset first duration, the terminal may send, after switching to the grant mode, other data by using a grant resource, or may still send the first data by using a grant resource.

Optionally, the second duration may be a constant value, or may be a variable value. For example, the second duration may be a parameter related to an identity (ID) of the terminal, a quantity of times the data is retransmitted, and the like. In a possible implementation, the second duration increases with the quantity of retransmissions. For example, second duration between the first retransmission and the second retransmission is less than second duration between the second retransmission and a third retransmission. Optionally, the second duration is greater than preset duration for returning an acknowledge frame by the network device. The duration for returning an acknowledge frame by the network device starts from a time when the terminal sends the first data and ends with a time when the terminal receives an acknowledge frame returned by the network device for the first data sent this time. After a structure of a data frame is fixed, the duration for returning an acknowledge frame by the network device is usually a constant value as well. For example, a latency of an acknowledge frame in an LTE FDD system is defined as a length of four subframes, that is, 4 ms.

Optionally, the third duration may be equal to the first duration in Embodiment a1, or may be equal to the second duration in Embodiment a2. Optionally, the third duration may be a constant value, or may be a variable value. For example, the third duration may be a parameter related to an identity (ID) of the terminal, a quantity of times the data is retransmitted, and the like. In a possible implementation, the third duration increases with the quantity of initial transmissions. Details of the third duration may be similar to those of the first duration in Embodiment a1. Details are not described herein again.

It can be learned from the foregoing manner that in this embodiment of the present disclosure, the terminal may trigger the terminal to switch from the grant-free mode to the grant mode. In this way, the terminal can accordingly choose, based on a specific data sending situation of the terminal, whether to switch back to the grant mode. This further optimizes a data sending manner and also improves reliability of data transmission.

In the second implementation, the network device triggers the terminal to switch from the grant-free mode to the grant mode.

There are a plurality of implementations in which the network device triggers the terminal to switch from the grant-free mode to the grant mode. In this embodiment of the present disclosure, descriptions are provided by using the following Embodiment b1, Embodiment b2, Embodiment b3, and Embodiment b4.

In this embodiment of the present disclosure, optionally, the network device preconfigures a batch of grant-free resources for all terminals within coverage of the network device. One or more terminals within the coverage of the network device may use the grant-free resources to transmit data in the grant-free mode.

The network device determines, in a plurality of cases, that terminals in the grant-free mode need to be reduced. In other words, the network device determines that one or more terminals need to switch from the grant-free mode to the grant mode. For example, the network device determines that current network load is greater than a preset load threshold. For another example, the network device periodically detects a decoding success rate of data received in the grant-free mode, and when the decoding success rate is less than a preset success rate threshold, the network device determines that terminals in the grant-free mode need to be reduced.

In a possible implementation, the network device determines that at least one terminal in a terminal set needs to switch from the grant-free mode to the grant mode, including: The network device determines data whose pilot is successfully detected within preset fourth duration and that is sent by using at least one grant-free resource; the network device determines, based on the data, a ratio of an amount of successfully decoded data to an amount of data whose pilot is successfully detected; and when determining that the ratio is less than a preset success rate threshold, the network device determines that the at least one terminal in the terminal set needs to switch from the grant-free mode to the grant mode.

For example, if the network device receives 1000 pieces of data within current 10 milliseconds (ms) by using a grant-free resource, the network device detects pilots of all the 1000 pieces of data, and the network device successfully decodes only 800 pieces of data, the network device determines that a decoding success rate is 80%. If a success rate threshold is 95%, the network device determines that the at least one terminal in the terminal set needs to switch from the grant-free mode to the grant mode.

Figure 2G:
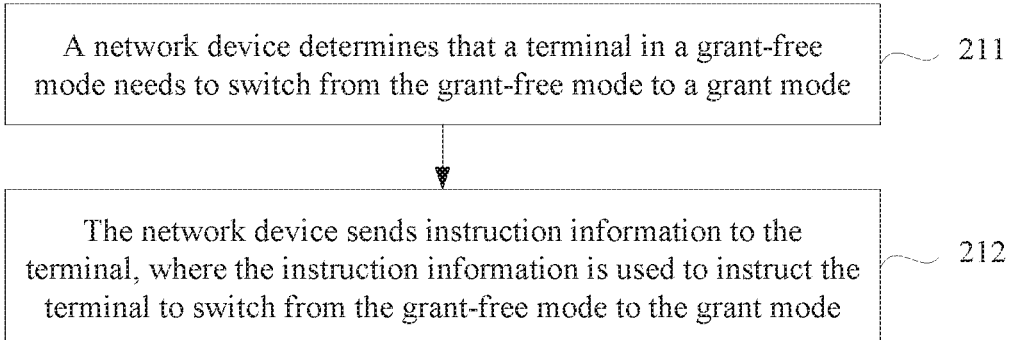
FIG. 2g is a schematic flowchart of another data transmission method according to an embodiment of the present disclosure.

FIG. 2g is a schematic flowchart of another data transmission method according to an embodiment of the present disclosure. As shown in FIG. 2g, the method includes:

Step 211: A network device determines that a terminal in a grant-free mode needs to switch from the grant-free mode to a grant mode.

Step 212: The network device sends instruction information to the terminal, where the instruction information is used to instruct the terminal to switch from the grant-free mode to the grant mode.

Because the network device sends the instruction information to the terminal when determining that the terminal in the grant-free mode needs to switch from the grant-free mode to the grant mode, the terminal may fall back to the grant mode when the terminal needs to switch from the grant-free mode to the grant mode, and transmit data in the grant mode. In this way, reliability of data transmission is improved.

Embodiment b1

The network device successfully receives data sent by the terminal by using a grant-free resource, and the network device sends the instruction information to the terminal by replying to the terminal with an acknowledge frame, so that the terminal falls back from the grant-free mode to the grant mode.

In Embodiment b1, the instruction information is first instruction information. The first instruction information and second instruction information in this embodiment of the present disclosure are merely used for differentiation, and do not impose a limitation.

Optionally, before the network device sends the instruction information to the terminal, the network device receives data sent by the terminal in the grant-free mode by using a grant-free resource; and the network device successfully decodes the data. That the network device sends instruction information to the terminal includes: sending, by the network device, an acknowledge frame for the data to the terminal, where the acknowledge frame includes the instruction information.

Correspondingly, that the terminal needs to switch from the grant-free mode to the grant mode includes: receiving, by the terminal, the acknowledge frame sent by the network device; obtaining first instruction information that is included in the acknowledge frame and used to instruct the terminal to switch from the grant-free mode to the grant mode; and determining, according to the first instruction information, that the terminal needs to switch from the grant-free mode to the grant mode. The first instruction information in this paragraph is the instruction information in the foregoing paragraph. Specifically, after the terminal receives and parses the acknowledge frame, if the acknowledge frame includes the first instruction information, the terminal can obtain the first instruction information; or if the acknowledge frame does not include the first instruction information, the terminal cannot obtain the first instruction information.

In this embodiment of the present disclosure, the instruction information may be in various forms. For example, one state bit is added to a channel of the acknowledge frame, and 1-bit information is used to indicate the instruction information. If the bit information is 0, it indicates that the acknowledge frame is a prior-art acknowledge frame and does not include the first instruction information used to instruct the terminal to fall back to the grant mode. The terminal may continue to transmit data in the grant-free mode. If the bit information is 1, it indicates that the acknowledge frame includes the first instruction information used to instruct the terminal to fall back to the grant mode. The terminal cannot continue to transmit data in the grant-free mode, but needs to fall back to the grant mode and transmit data in the grant mode by using a grant resource.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

Embodiment b2

The network device successfully receives data sent by the terminal by using a grant-free resource, and the network device sends the instruction information to the terminal by replying to the terminal with an acknowledge frame, so that the terminal falls back from the grant-free mode to the grant mode.

Optionally, the instruction information is an identifier of any one of a plurality of preset instruction resources, and the identifier of the any one of the plurality of instruction resources is used to instruct the terminal to switch from the grant-free mode to the grant mode.

Before the network device sends the instruction information to the terminal, the network device receives the data sent by the terminal in the grant-free mode by using the grant-free resource, and the network device successfully decodes the data. That the network device sends instruction information to the terminal includes: sending, by the network device, an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode.

Correspondingly, optionally, that the terminal needs to switch from the grant-free mode to the grant mode includes: receiving, by the terminal, the acknowledge frame sent by the network device; and determining, when determining that the resource used by the acknowledge frame is one of the plurality of preset instruction resources, that the terminal needs to switch from the grant-free mode to the grant mode, where any one of the plurality of preset instruction resources is a resource used to instruct the terminal to switch from the grant-free mode to the grant mode.

In Embodiment b2, optionally, a plurality of instruction resources are preset, and the plurality of instruction resources are a plurality of resources in numerous resources of the network device. The network device feeds back the acknowledge frame to the terminal by using one of the plurality of instruction resources. When the terminal determines that an identifier of the resource for transmitting the acknowledge frame is one of the plurality of preset instruction resources, the terminal needs to fall back to the grant mode.

Specifically, resources used by the network device to feed back an acknowledge frame may be classified into two categories, such as a first type of resources and a second type of resources. The resource used by the network device to feed back the acknowledge frame may be any one or more of a time-frequency resource, a space domain resource, and a code domain resource, or the like. For example, after the network device feeds back the acknowledge frame by using the first type of resources and the terminal successfully receives the acknowledge frame, the terminal falls back to the grant mode. After the network device feeds back the acknowledge frame by using the second type of resources and the terminal successfully receives the acknowledge frame, the terminal continues to use the grant-free mode.

Optionally, after the terminal needs to switch from the grant-free mode to the grant mode, the terminal initiates any one or more of a random access request, a service request, and a scheduling request to the network device. For detailed content, refer to the description in Embodiment a1, Details are not described herein again.

Embodiment b3

The network device presets a plurality of grant-free resources. When determining that terminals in the grant-free mode need to be reduced, the network device may broadcast instruction information to the terminals. A terminal receiving the instruction information determines whether the terminal is a terminal that needs to fall back.

In Embodiment b3, the instruction information is second instruction information. First instruction information and the second instruction information in this embodiment of the present disclosure are merely used for differentiation, and do not impose a limitation.

Optionally, the instruction information includes an identifier of one or more to-be-switched grant-free resources. Before the network device sends the instruction information to the terminal, the method further includes: determining, by the network device, an identifier of a to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information.

Optionally, that the terminal needs to switch from the grant-free mode to the grant mode includes: receiving, by the terminal, second instruction information sent by the network device, where the second instruction information includes an identifier of a to-be-switched grant-free resource; and determining, by the terminal when determining that the identifier of the to-be-switched grant-free resource is a resource identifier of a resource used by the terminal to send first data, that the terminal needs to switch from the grant-free mode to the grant mode.

For example, the network device determines, from preset grant-free resources, that identifiers of to-be-switched grant-free resources are 001 and 002. A batch of terminals A within coverage of the network device transmits data by using grant-free resources before receiving the second instruction information. Any terminal in a batch of terminals B in the batch of terminals A transmits data most recently by using a grant-free resource whose resource identifier is 001 or 002 before receiving the second instruction information. In other words, each terminal in the batch of terminals B needs to fall back to the grant mode.

An example is used to describe a concept of the recent data. For example, in a period of time, according to a time sequence, a terminal D transmits data by using a grant-free resource whose resource identifier is 003, transmits data by using a grant-free resource whose resource identifier is 006, transmits data by using a grant-free resource whose resource identifier is 001, and receives the second instruction information. In this case, the recent data is the data transmitted most recently before the terminal D receives the second instruction information, to be specific, the data transmitted by using the grant-free resource whose resource identifier is 001. A resource used by the terminal D to send the recent data is the grant-free resource whose resource identifier is 001.

In other words, in this example, provided that a resource used to send the recent data is a to-be-switched grant-free resource, the terminal needs to fall back to the grant mode, regardless of whether the data sent by the terminal is correctly decoded by the network device.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

In Embodiment b3, the network device may randomly determine the identifier of the to-be-switched grant-free resource from the preset grant-free resource, or may use, as the to-be-switched grant-free resource, a grant-free resource corresponding to a highest decoding failure rate when data is transmitted by using grant-free resources within a period of time. Alternatively, the network device randomly selects, as the to-be-switched grant-free resource, one or more grant-free resources on which data that fails to be decoded is received within a period of time. Specifically, the network device determines an identifier of at least one to-be-switched grant-free resource from the preset grant-free resource, including: The network device determines data that fails to be decoded in data that is received within preset fifth duration by using a grant-free resource; the network device determines at least one grant-free resource used by the data that fails to be decoded; and the network device determines an identifier of at least one to-be-switched grant-free resource from the at least one grant-free resource used by the data that fails to be decoded.

Embodiment b4

The network device presets a plurality of grant-free resources. When determining that terminals in the grant-free mode need to be reduced, the network device may broadcast instruction information to the terminals. A terminal receiving the instruction information determines whether the terminal is a terminal that needs to fall hack.

In Embodiment b4, the instruction information is second instruction information. First instruction information and the second instruction information in this embodiment of the present disclosure are merely used for differentiation, and do not impose a limitation.

Optionally, the instruction information includes an identifier of a to-be-switched grant-free resource. Before the network device sends the instruction information to the terminal, the method further includes: determining, by the network device, the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information.

Optionally, before the terminal needs to switch from the grant-free mode to the grant mode, the method further includes: determining, by the terminal, that no acknowledge frame returned by the network device for first data is received.

For example, the network device determines, from preset grant-free resources, that identifiers of to-be-switched grant-free resources are 001 and 002. A batch of terminals A within coverage of the network device transmits data by using grant-free resources before receiving the second instruction information. Any terminal in a batch of terminals B in the batch of terminals A transmits data most recently by using a grant-free resource whose resource identifier is 001 or 002 before receiving the second instruction information. Each terminal in a batch of terminals C in the batch of terminals B is a terminal that receives, when sending recent data to the network device by using a grant-free resource, no acknowledge frame fed back by the network device. In other words, each terminal in the batch of terminals C needs to fall back to the grant mode.

In other words, the terminal needs to fall back to the grant mode when the resource used to send the recent data is a to-be-switched grant-free resource and the terminal receives no acknowledge frame for the recent data sent by the terminal. Correspondingly, if the resource used to send the recent data is a to-be-switched grant-free resource, and the terminal receives an acknowledge frame for the recent data sent by the terminal, indicating that the recent data of the terminal is correctly decoded by the network device, the terminal does not need to fall back to the grant mode, but can still transmit data in the grant-free mode by using a grant-free resource.

Optionally, after the terminal needs to switch from the grant-free mode to the grant mode, the terminal initiates any one or more of a random access request, a service request, and a scheduling request to the network device. For detailed content, refer to the description in Embodiment a1. Details are not described herein again.

In Embodiment b4, the network device may randomly determine the identifier of the to-be-switched grant-free resource from the preset grant-free resource, or may use, as the to-be-switched grant-free resource, a grant-free resource corresponding to a highest decoding failure rate when data is transmitted by using grant-free resources within a period of time. Alternatively, the network device randomly selects, as the to-be-switched grant-free resource, one or more grant-free resources on which data that fails to be decoded is received within a period of time. For detailed descriptions, refer to the solution in Embodiment b3. Details are not described herein again.

Optionally, the network device may use a specific channel or resource to send the second instruction information. The specific channel may be an existing channel or may be a specially defined channel. The resource may be any one or more of a time-frequency resource, a code domain resource, and a space domain resource, or the like.

The following two manners are a manner 1 described based on Embodiment a1 and a manner 2 described based on Embodiment b1 and Embodiment b2. The following examples are described by using a scheduling request as an example. The scheduling request is used by the terminal to request, from the network device, one opportunity to transmit uplink data.

Manner 1

If a data packet is to be transmitted by a user using Grant-Free Transmission Mode, the user shall, //*If a user transmits a data packet in a grant-free mode, the user shall,*//

If the transmission is a first initial transmission of the data packet, after the data packet is initially transmitted for the first time, set a counter C to 1 and reset a timer T1;
If the timer T1 reaches preset duration and no "ACK" is successfully received by the user,
If the counter C is less than M, initially transmit the data packet again, increase a value of the counter C by 1, and reset the timer T1;
If the counter C is equal to M,
If the user is in an RRC idle mode, initiate a random access process by sending a preamble, to obtain an opportunity to transmit uplink data;
If the user is in an RRC connected mode, send a scheduling request to the network device, to obtain an opportunity to transmit uplink data;
If the user needs to set up a new RRC connection, the terminal sets up an RRC connection again.

Manner 2

Upon successful detection, in a network, of an acknowledge frame fed back to a terminal, the terminal that transmits data in a grant-free mode shall,
If the acknowledge frame includes instruction information used to instruct the terminal to switch to the grant mode,
If the user is in an RRC idle mode, initiate a random access process by sending a preamble, to obtain an opportunity to transmit uplink data;
If the user is in an RRC connected mode, send a scheduling request to the network device, to obtain an opportunity to transmit uplink data;
If the user needs to set up a new RRC connection, the terminal sets up an RRC connection again.

According to the descriptions of the foregoing solution, it can be learned that this embodiment of the present disclosure provides a fallback solution in which the terminal falls back from the grant-free mode to the grant mode. In a specific scenario, for example, if there are a large quantity of terminals in the grant-free mode, and a user using the grant-free mode faces a poor condition of a channel (a grant-free resource), or a decoding success rate is relatively low in transmission in the grant-free mode, the solution provided in this embodiment of the present disclosure enables the terminal in the grant-free mode to fall back to the grant mode. This can improve network transmission efficiency and mitigate network congestion. In a second aspect, a transmission failure caused by a pilot collision can be fundamentally avoided and a pilot collision probability is reduced. In a third aspect, a transmission failure caused by a poor channel condition can be fundamentally avoided, and the network device can perform scheduling based on real-time channel information of the terminal, to resolve a transmission problem of the terminal.

It can be learned from the foregoing content that in this embodiment of the present disclosure, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Figure 3:
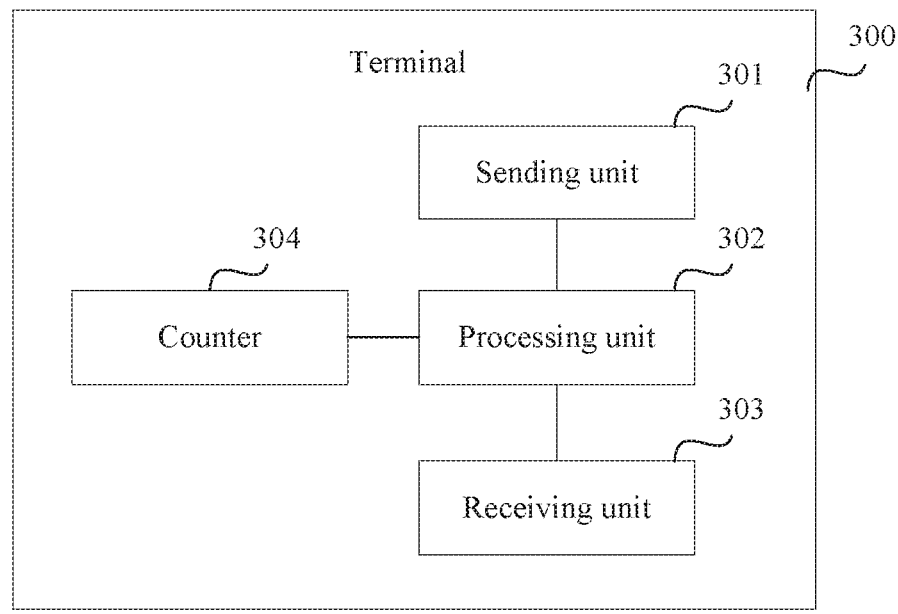
FIG. 3 is a schematic structural diagram of a terminal according to an embodiment of the present disclosure.

FIG. 3 is a schematic structural diagram of a terminal according to an embodiment of the present disclosure.

Based on a same idea, this embodiment of the present disclosure provides a terminal, configured to perform the foregoing method procedures. As shown in FIG. 3, the terminal 300 includes a sending unit 301 and a processing unit 302. Optionally, a receiving unit 303 is further included. Optionally, a counter 304 is further included.

The sending unit is configured to: send, in a grant-free mode, first data to a network device by using a grant-free resource; and send, in a grant mode, second data to the network device by using a grant resource.

The processing unit is configured to send, by using the sending unit in the grant mode by using the grant resource, the second data to the network device when determining that the terminal needs to switch from the grant-free mode to the grant mode.

Optionally, the sending unit is specifically configured to: initially transmit the first data to the network device for the first time in the grant-free mode by using the grant-free resource; and initially transmit the first data to the network device again when no acknowledge frame returned by the network device for the first data initially transmitted for the first time is received within preset first duration.

The processing unit is specifically configured to determine, when determining that a quantity of times the first data is initially transmitted reaches a preset initial transmission times threshold, that the terminal needs to switch from the grant-free mode to the grant mode.

Optionally, the sending unit is specifically configured to initially transmit the first data to the network device for the first time in the grant-free mode by using the grant-free resource.

The processing unit is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the counter is configured to count a quantity of times the first data is retransmitted. The sending unit is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration.

The processing unit is specifically configured to determine, when a quantity of times the first data is initially transmitted reaches a preset initial transmission times threshold and no acknowledge frame returned by the network device for the first data is received, that the terminal needs to switch from the grant-free mode to the grant mode.

Optionally, the counter is configured to count a quantity of times the first data is retransmitted. The sending unit is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration.

The processing unit is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the receiving unit is configured to receive an acknowledge frame sent by the network device.

The processing unit is specifically configured to: obtain first instruction information that is included in the acknowledge frame and used to instruct the terminal to switch from the grant-free mode to the grant mode; and determine, according to the first instruction information, that the terminal needs to switch from the grant-free mode to the grant mode.

Optionally, the receiving unit is configured to receive an acknowledge frame sent by the network device. The processing unit is specifically configured to determine, when determining that a resource used by the acknowledge frame is one of a plurality of preset instruction resources, that the terminal needs to switch from the grant-free mode to the grant mode, where any one of the plurality of preset instruction resources is a resource used to instruct the terminal to switch from the grant-free mode to the grant mode.

Optionally, the receiving unit is further configured to:
receive second instruction information sent by the network device, where the second instruction information includes an identifier of a to-be-switched grant-free resource.

The processing unit is specifically configured to:
determine, when determining that the identifier of the to-be-switched grant-free resource is a resource identifier of a resource used by the terminal to send the first data, that the terminal needs to switch from the grant-free mode to the grant mode.

Optionally, the processing unit is further configured to determine, before the terminal needs to switch from the grant-free mode to the grant mode, that no acknowledge frame returned by the network device for the first data is received.

It can be learned from the foregoing content that in this embodiment of the present disclosure, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Figure 4:
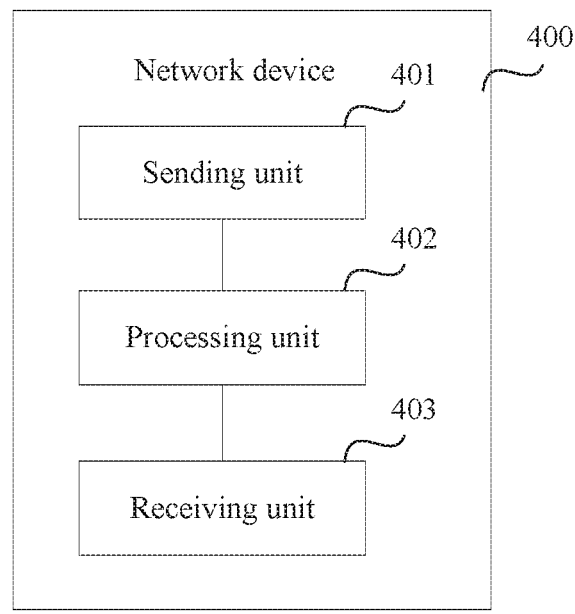
FIG. 4 is a schematic structural diagram of a network device according to an embodiment of the present disclosure.

FIG. 4 is a schematic structural diagram of a network device according to an embodiment of the present disclosure. Based on a same idea, this embodiment of the present disclosure provides a network device, configured to perform the foregoing method procedures. As shown in FIG. 4, the network device 400 includes a sending unit 401 and a processing unit 402. Optionally, a receiving unit 403 is further included.

The processing unit is configured to determine that a terminal in a grant-free mode needs to switch from the grant-free mode to a grant mode.

The sending unit is configured to send instruction information to the terminal, where the instruction information is used to instruct the terminal to switch from the grant-free mode to the grant mode.

Optionally the receiving unit is configured to: before the sending unit sends the instruction information to the terminal, receive data sent by the terminal in the grant-free mode by using a grant-free resource.

The processing unit is configured to decode the data.

The sending unit is configured to: when the data is successfully decoded, send an acknowledge frame for the data to the terminal, where the acknowledge frame includes the instruction information.

Optionally, the instruction information is an identifier of any one of a plurality of preset instruction resources, and the identifier of the any one of the plurality of preset instruction resources is used to instruct the terminal to switch from the grant-free mode to the grant mode. The network device further includes the receiving unit, configured to: before the sending unit sends the instruction information to the terminal, receive data sent by the terminal in the grant-free mode by using a grant-free resource.

The processing unit is configured to decode the data.

The sending unit is configured to: when the data is successfully decoded, send an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode.

Optionally, the instruction information includes an identifier of a to-be-switched grant-free resource. The processing unit is further configured to determine the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information.

Optionally, the instruction information includes an identifier of a to-be-switched grant-free resource. The processing unit is further configured to determine the identifier of the to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information.

It can be learned from the foregoing content that in this embodiment of the present disclosure, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Figure 5:
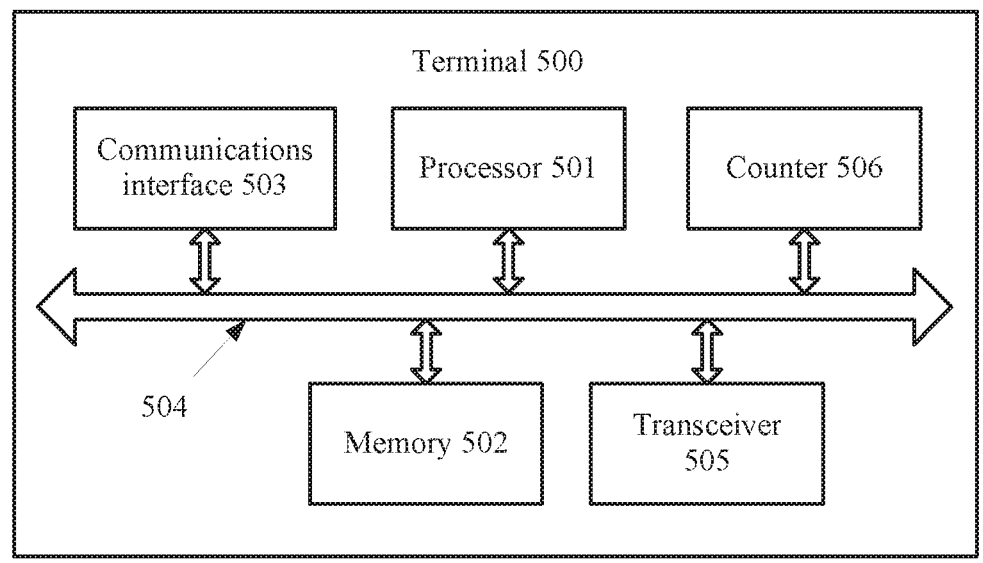
FIG. 5 is a schematic structural diagram of another terminal according to an embodiment of the present disclosure.

FIG. 5 is a schematic structural diagram of a terminal according to this application. Based on a same idea, this application provides a terminal, configured to perform the foregoing method procedures. As shown in FIG. 5, the terminal 500 includes a processor 501, a memory 502, a communications interface 503, and a transceiver 505. Optionally, a counter 506 is further included. The processor 501, the memory 502, the communications interface 503, and the transceiver 505 are mutually connected by using a bus 504.

The bus 504 may be a peripheral component interconnect (PCI) bus, an extended industry standard architecture (EISA) bus, or the like. The bus may be categorized into an address bus, a data bus, a control bus, and the like. For ease of indication, the bus is indicated by using only one bold line in FIG. 4. However, it does not indicate that there is only one bus or only one type of bus.

The memory 502 may include a volatile memory (volatile memory), for example, a random-access memory (RAM). Alternatively, the memory may include a non-volatile memory, for example, a flash memory, a hard disk drive (HDD), or a solid-state drive (SSD). Alternatively, the memory 502 may include a combination of the foregoing types of memories.

The communications interface 503 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 501 may be a central processing unit (CPU), a network processor (NP), or a combination of a CPU and an NP.

The processor 501 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 502 may be further configured to store a program instruction. By invoking the program instruction stored in the memory 502, the processor 501 may perform one or more steps or an optional implementation in the embodiments shown in FIG. 2 to FIG. 2g, so that the terminal 500 implements a function of the terminal in the foregoing methods.

The transceiver is configured to: send, in a grant-free mode, first data to a network device by using a grant-free resource; and send, in a grant mode, second data to the network device by using a grant resource.

The processor is configured to send, by using the transceiver in the grant mode by using the grant resource, the second data to the network device when determining that the terminal needs to switch from the grant-free mode to the grant mode.

Optionally, the transceiver is specifically configured to: initially transmit the first data to the network device for the first time in the grant-free mode by using the grant-free resource; and initially transmit the first data to the network device again when no acknowledge frame returned by the network device for the first data initially transmitted for the first time is received within preset first duration.

The processor is specifically configured to determine, when determining that a quantity of times the first data is initially transmitted reaches a preset initial transmission times threshold, that the terminal needs to switch from the grant-free mode to the grant mode.

Optionally the transceiver is specifically configured to initially transmit the first data to the network device for the first time in the grant-free mode by using the grant-free resource.

The processor is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the terminal further includes a counter, configured to count a quantity of times the first data is retransmitted. The transceiver is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration.

The processor is specifically configured to determine, when a quantity of times the first data is initially transmitted reaches a preset initial transmission times threshold and no acknowledge frame returned by the network device for the first data is received, that the terminal needs to switch from the grant-free mode to the grant mode.

Optionally, the terminal further includes a counter, configured to count a quantity of times the first data is retransmitted. The transceiver is specifically configured to: initially transmit the first data to the network device for the first time in the grant-free mode by using the grant-free resource; retransmit the first data to the network device when no acknowledge frame returned by the network device for the first data is received within preset second duration; and initially transmit the first data again when a value of the counter increases to a preset retransmission times threshold and no acknowledge frame returned by the network device for the first data is received within preset third duration.

The processor is specifically configured to determine, when duration starting from a time when the first data is initially transmitted for the first time reaches a preset duration threshold and no acknowledge frame returned by the network device for the first data is received, that the terminal needs to switch from the grant-free mode to the grant mode.

Optionally, the transceiver is further configured to receive an acknowledge frame sent by the network device.

The processor is specifically configured to: obtain first instruction information that is included in the acknowledge frame and used to instruct the terminal to switch from the grant-free mode to the grant mode; and determine, according to the first instruction information, that the terminal needs to switch from the grant-free mode to the grant mode.

Optionally, the transceiver is further configured to receive an acknowledge frame sent by the network device.

The processor is specifically configured to determine, when determining that a resource used by the acknowledge frame is one of a plurality of preset instruction resources, that the terminal needs to switch from the grant-free mode to the grant mode, where any one of the plurality of preset instruction resources is a resource used to instruct the terminal to switch from the grant-free mode to the grant mode.

Optionally, the transceiver is further configured to receive second instruction information sent by the network device, where the second instruction information includes an identifier of a to-be-switched grant-free resource.

The processor is specifically configured to determine, when determining that the identifier of the to-be-switched grant-free resource is a resource identifier of a resource used by the terminal to send the first data, that the terminal needs to switch from the grant-free mode to the grant mode.

Optionally, the processor is further configured to determine, before the terminal needs to switch from the grant-free mode to the grant mode, that no acknowledge frame returned by the network device for the first data is received.

It can be learned from the foregoing content that in this embodiment of the present disclosure, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

Figure 6:
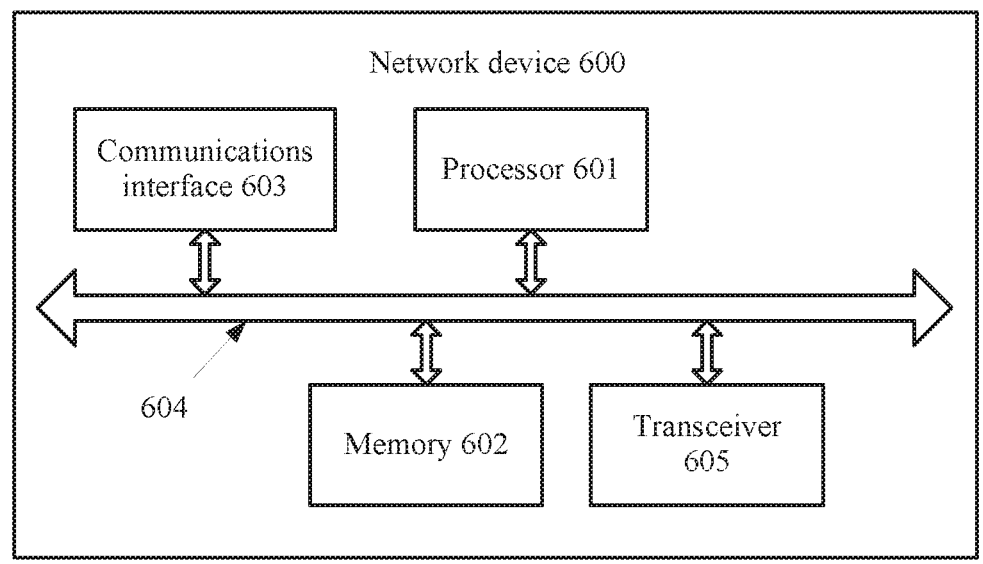
FIG. 6 is a schematic structural diagram of another network device according to an embodiment of the present disclosure.

FIG. 6 is a schematic structural diagram of a network device according to this application. Based on a same idea, this application provides a network device, configured to perform the foregoing method procedures. As shown in FIG. 6, the network device 600 includes a processor 601, a memory 602, a communications interface 603, and a transceiver 605. The processor 601, the memory 602, the communications interface 603, and the transceiver 605 are mutually connected by using a bus 604.

The bus 604 may be a PCI bus, an EISA bus, or the like. The bus may be categorized into an address bus, a data bus, a control bus, and the like. For ease of indication, the bus is indicated by using only one bold line in FIG. 4. However, it does not indicate that there is only one bus or only one type of bus.

The memory 602 may include a volatile memory, for example, a RAM. Alternatively, the memory may include a non-volatile memory, for example, a flash memory, an HDD, or an SSD. Alternatively, the memory 602 may include a combination of the foregoing types of memories.

The communications interface 603 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 601 may be a CPU, an NP, or a combination of a CPU and an NP.

The processor 601 may further include a hardware chip. The hardware chip may be an ASIC, a PLD, or a combination thereof. The PLD may be a CPLD, an FPGA, GAL, or any combination thereof.

Optionally, the memory 602 may be further configured to store a program instruction. By invoking the program instruction stored in the memory 602, the processor 601 may perform one or more steps or an optional implementation in the embodiments shown in FIG. 2 to FIG. 2g, so that the network device 600 implements a function of the network device in the foregoing methods.

The processor is configured to determine that a terminal n a grant-free mode needs to switch from the grant-free mode to a grant mode.

The transceiver is configured to send instruction information to the terminal, where the instruction information is used to instruct the terminal to switch from the grant-free mode to the grant mode.

Optionally the transceiver is further configured to: before sending the instruction information to the terminal, receive data sent by the terminal in the grant-free mode by using a grant-free resource; and when the processor successfully decodes the data, send an acknowledge frame for the data to the terminal, where the acknowledge frame includes the instruction information.

Optionally, the instruction information is an identifier of any one of a plurality of preset instruction resources, and the identifier of the any one of the plurality of preset instruction resources is used to instruct the terminal to switch from the grant-free mode to the grant mode.

The transceiver is configured to: before sending the instruction information to the terminal, receive data sent by the terminal in the grant-free mode by using a grant-free resource; and when the processor successfully decodes the data, send an acknowledge frame for the data to the terminal by using a resource in the plurality of instruction resources, where the acknowledge frame is used to enable the terminal to determine, when the terminal determines that an identifier of the resource used by the acknowledge frame is an identifier of any one of the plurality of preset instruction resources, that the terminal needs to switch from the grant-free mode to the grant mode.

Optionally, the instruction information includes an identifier of a to-be-switched grant-free resource. The processor is further configured to determine the identifier of the to-be-switched grant-free resource from a preset grant-free resource. The terminal is a terminal that sends recent data by using the to-be-switched grant-free resource and receives no acknowledge frame returned by the network device for the recent data. The recent data is data sent by the to-be-switched terminal to the network device most recently by using a grant-free resource before the terminal receives the instruction information.

Optionally, the instruction information includes an identifier of a to-be-switched grant-free resource. The processor is further configured to determine the identifier of the to-be-switched grant-free resource from a preset grant-free resource. The terminal is a terminal that sends recent data by using the to-be-switched grant-free resource. The recent data is data sent by the to-be-switched terminal to the network device most recently by using a grant-free resource before the terminal receives the instruction information.

It can be learned from the foregoing content that in this embodiment of the present disclosure, if the terminal needs to switch from the grant-free mode to the grant mode, the terminal falls back to the grant mode and transmits data in the grant mode. In this way, reliability of data transmission is improved. Compared with a prior-art solution in which when transmission in a grant-free mode fails, data transmission performed by a terminal is paused or a grant-free resource is reconfigured for the terminal, a success rate of data transmission is improved to a relatively great extent.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

Persons skilled in the art should understand that the embodiments of the present disclosure may be provided as a method or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specified function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A data transmission method, comprising:
   sending, by a terminal in a grant-free mode, first data to a network device by using a grant-free resource; and
   determining, by the terminal, that the terminal needs to switch from the grant-free mode to a grant mode based on whether acknowledgement for the first data is received from the network device when a preset condition is met, and sending, by the terminal in the grant mode, second data to the network device by using a grant resource.

2. The method according to claim 1, wherein:
   sending, by the terminal in the grant-free mode, the first data to the network device by using the grant-free resource comprises:
   initially transmitting, by the terminal, the first data to the network device for a first time in the grant-free mode by using the grant-free resource, and
   initially transmitting, by the terminal, the first data to the network device again when no acknowledge frame returned by the network device for the first data initially transmitted for the first time is received within a preset first duration; and
   determining, by the terminal, that the terminal needs to switch from the grant-free mode to the grant mode comprises:
   determining, by the terminal, that a quantity of times the first data is initially transmitted reaches a preset initial transmission times threshold.

3. The method according to claim 1, wherein:
   sending, by the terminal in the grant-free mode, the first data to the network device by using the grant-free resource comprises:
   initially transmitting, by the terminal, the first data to the network device for a first time in the grant-free mode by using the grant-free resource; and
   determining, by the terminal, that the terminal needs to switch from the grant-free mode to the grant mode comprises:
   determining, when a duration starting from a time when the first data is initially transmitted for the first time reaches a preset duration threshold and no acknowledge frame returned by the network device for the first data is received.

4. The method according to claim 1, wherein:
   sending, by the terminal in the grant-free mode, the first data to the network device by using the grant-free resource comprises:
   initially transmitting, by the terminal, the first data to the network device for a first time in the grant-free mode by using the grant-free resource,
   retransmitting, by the terminal, the first data to the network device when no acknowledge frame returned by the network device for the first data is received within a preset second duration, and counting, by using a counter, a quantity of times that the first data is retransmitted, and
   initially transmitting, by the terminal, the first data again when the terminal determines that a value of the counter increases to a preset retransmission times threshold and determines that no acknowledge frame returned by the network device for the first data is received within a preset third duration; and
   determining, by the terminal, that the terminal needs to switch from the grant-free mode to the grant mode comprises:
   determining when a quantity of times that the first data is initially transmitted reaches a preset initial transmission times threshold and no acknowledge frame returned by the network device for the first data is received; or
   determining when a duration starting from a time when the first data is initially transmitted for the first time reaches a preset duration threshold and no acknowledge frame returned by the network device for the first data is received.

5. The method according to claim 1, further comprising:
   receiving, by the terminal, an acknowledge frame sent by the network device, and obtaining first instruction information that is comprised in the acknowledge frame and instructs the terminal to switch from the grant-free mode to the grant mode; or
   receiving, by the terminal, an acknowledge frame sent by the network device, and determining that a resource used by the acknowledge frame is any one of a plurality of preset instruction resources used to instruct the terminal to switch from the grant-free mode to the grant mode.

6. The method according to claim 1, further comprising:
   receiving, by the terminal, second instruction information sent by the network device, wherein the second instruction information comprises an identifier of a to-be-switched grant-free resource; and
   determining that the identifier of the to-be-switched grant-free resource is a resource identifier of a resource used by the terminal to send the first data.

7. The method according to claim 6, before determining, by the terminal, that the terminal needs to switch from the grant-free mode to the grant mode, the method further comprises:
   determining, by the terminal, that no acknowledge frame returned by the network device for the first data is received.

8. The method according to claim 1, after determining, by the terminal, that the terminal needs to switch from the grant-free mode to the grant mode, the method further comprises:
   initiating, by the terminal, any one or more of a random access request, a service request, or a scheduling request to the network device.

9. The method according to claim 1, after determining, by the terminal, that the terminal needs to switch from the grant-free mode to the grant mode, the method further comprises:
   initiating, by the terminal, a random access request to the network device; and
   receiving, by the terminal, a random access response fed back by the network device.

10. The method according to claim 1, after determining, by the terminal, that the terminal needs to switch from the grant-free mode to the grant mode, the method further comprises:
    sending, by the terminal, a service request or a scheduling request to the network device requesting for the grant resource from the network device;
    receiving, by the terminal, an identifier of the grant resource allocated to the terminal by the network device; and
    sending, by the terminal, the second data on the grant resource.

11. A terminal, comprising:
    a memory for storing instructions;
    a transceiver, configured to:
        send, in a grant-free mode, first data to a network device by using a grant-free resource, and
        send, in a grant mode, second data to the network device by using a grant resource; and
    a processor, coupled to the memory storing the instructions that, when executed by the processor, cause the terminal to:
        determine that the terminal needs to switch from the grant-free mode to the grant mode based on whether acknowledgement for the first data is received from the network device when a preset condition is met, and
        send, by using the transceiver in the grant mode, the second data to the network device by using the grant resource.

12. The terminal according to claim 11, wherein the transceiver is configured to:
    initially transmit the first data to the network device for a first time in the grant-free mode by using the grant-free resource;
    initially transmit the first data to the network device again when no acknowledge frame returned by the network device for the first data initially transmitted for the first time is received within a preset first duration; and
    wherein determining that the terminal needs to switch form the grant-free mode to the grant mode comprises:
    determining that a quantity of times the first data is initially transmitted reaches a preset initial transmission times threshold.

13. The terminal according to claim 11, wherein:
    the transceiver is configured to: initially transmit the first data to the network device for a first time in the grant-free mode by using the grant-free resource; and
    wherein determining that the terminal needs to switch form the grant-free mode to the grant mode comprises:
    determining when a duration starting from a time when the first data is initially transmitted for the first time reaches a preset duration threshold and no acknowledge frame returned by the network device for the first data is received.

14. The terminal according to claim 11, wherein:
    the processor is further configured to count, using a counter, a quantity of times that the first data is retransmitted;
    the transceiver is further configured to:
    initially transmit the first data to the network device for a first time in the grant-free mode by using the grant-free resource,
    retransmit the first data to the network device when no acknowledge frame returned by the network device for the first data is received within a preset second duration, and
    initially transmit the first data again when a value of the counter increases to a preset retransmission times threshold and no acknowledge frame returned by the network device for the first data is received within a preset third duration; and
    wherein determining that the terminal needs to switch form the grant-free mode to the grant mode comprises:
    determining when a quantity of times the first data is initially transmitted reaches a preset initial transmission times threshold and no acknowledge frame returned by the network device for the first data is received, or
    determining when a duration starting from a time when the first data is initially transmitted for the first time reaches a preset duration threshold and no acknowledge frame returned by the network device for the first data is received.

15. The terminal according to claim 11, wherein:
    the transceiver is further configured to:
    receive an acknowledge frame sent by the network device; and
    wherein the instructions, when executed by the processor, cause the terminal further to:
    obtain first instruction information that is comprised in the acknowledge frame and used to instruct the terminal to switch from the grant-free mode to the grant mode, or
    determine that a resource used by the acknowledge frame is one of a plurality of preset instruction resources used to instruct the terminal to switch from the grant-free mode to the grant mode.

16. The terminal according to claim 11, wherein:
    the transceiver is further configured to:
    receive second instruction information sent by the network device, wherein the second instruction information comprises an identifier of a to-be-switched grant-free resource; and
    wherein the instructions, when executed by the processor, cause the terminal further to:
    determine that the identifier of the to-be-switched grant-free resource is a resource identifier of a resource used by the terminal to send the first data.

17. The terminal according to claim 16, wherein the processor is further configured to:
 determine, before the terminal determines that it needs to switch from the grant-free mode to the grant mode, that no acknowledge frame returned by the network device for the first data is received.

* * * * *